United States Patent
Xu et al.

(10) Patent No.: US 11,682,203 B2
(45) Date of Patent: Jun. 20, 2023

(54) FEATURE EXTRACTION METHOD, MODEL TRAINING METHOD, DETECTION METHOD OF FRUIT SPECTRUM

(71) Applicants: Institute of Facility Agriculture, Guangdong Academy of Agricultural Science, Guangdong (CN); Guangdong Laboratory for Lingnan Modern Agriculture, Guangdong (CN)

(72) Inventors: Sai Xu, Guangdong (CN); Huazhong Lu, Guangdong (CN); Xin Liang, Guangdong (CN)

(*) Notice: Subject to any disclaimer, the term of this patent is extended or adjusted under 35 U.S.C. 154(b) by 0 days.

(21) Appl. No.: 17/869,879

(22) Filed: Jul. 21, 2022

(65) Prior Publication Data
US 2023/0083101 A1 Mar. 16, 2023

(30) Foreign Application Priority Data
Sep. 13, 2021 (CN) .......................... 202111065948.1

(51) Int. Cl.
*G06V 20/10* (2022.01)
*G06V 10/77* (2022.01)
(Continued)

(52) U.S. Cl.
CPC .......... *G06V 20/188* (2022.01); *G06V 10/141* (2022.01); *G06V 10/761* (2022.01); *G06V 10/7715* (2022.01); *G06V 2201/07* (2022.01)

(58) Field of Classification Search
CPC .............. G06V 20/188; G06V 10/141; G06V 10/7715; G06V 10/761; G06V 2201/07
See application file for complete search history.

(56) References Cited

FOREIGN PATENT DOCUMENTS

| CN | 103837492 A | 6/2014 |
|---|---|---|
| CN | 109100323 A | 12/2018 |

(Continued)

OTHER PUBLICATIONS

Guo, Zhiming, et al. "Quantitative detection of apple watercore and soluble solids content by near infrared transmittance spectroscopy." Journal of Food Engineering 279 (2020): 109955. (Year: 2020).*

(Continued)

*Primary Examiner* — Vu Le
*Assistant Examiner* — Tracy Mangialaschi

(57) ABSTRACT

A feature extraction method of fruit spectrum includes taking a vector of each wavelength point in spectrum of samples as source data, and acquiring a sorting of all vectors by processing the source data by SPA; according to the sorting of the vectors, acquiring distribution points of each sample on a coordinate system; acquiring classification results of the samples by destructive analysis, and acquiring a number of first sample categories; acquiring a first Euclidean distance between the first sample categories; according to a sorting of the wavelength points, acquiring distribution points of each sample on the coordinate system; acquiring a number of second sample categories; acquiring a second Euclidean distance between the second sample categories; determining whether the first Euclidean distance is less than the second Euclidean distance; determine a (M+2)-th vector to be valid or invalid based on a comparison result.

9 Claims, 14 Drawing Sheets

(51) Int. Cl.
  *G06V 10/74* (2022.01)
  *G06V 10/141* (2022.01)

(56) References Cited

FOREIGN PATENT DOCUMENTS

| | | |
|---|---|---|
| CN | 110335249 A | 10/2019 |
| CN | 110596117 A | 12/2019 |
| CN | 111795943 A | 10/2020 |
| CN | 111855608 A | 10/2020 |
| CN | 112903602 A | 6/2021 |
| WO | 2021128785 A1 | 7/2021 |

OTHER PUBLICATIONS

Shao, Yuanyuan, et al. "Determination of the bruise degree for cherry using Vis-NIR reflection spectroscopy coupled with multivariate analysis." PLos one 14.9 (2019): e0222633. (Year: 2019).*

Sukwanit, S., and S. Teerachaichayut. "Nondestructive prediction of internal browning in pineapple using transmittance short wavelength near infrared spectroscopy." Southeast Asia Symposium on Quality Management in Postharvest Systems and Asia Pacific Symposium on Postharvest Quality 989. 2012. (Year: 2012).*

Khatiwada B. Non-invasive detection of internal defects in fruit by using visible-shortwave NIR spectroscopy (Doctoral dissertation, CQ University) Aug. 2015. (Year: 2015).*

Yangjun Hu et al., Commercial Orange Juice Beverages Detection by Fluorescence Spectroscopy Combined with PCA-ED and PLSR Methods, Spectroscopy and Spectral Analysis, Aug. 2014, pp. 2143-2147, vol. 34, No. 8.

Pavel Pořízka et al., On the utilization of Principal Component Analysis in Laser-Induced Breakdown Spectroscopy data analysis, a review, Spectrochimica Acta Part B: Atomic Spectroscopy, 2018, pp. 65-82, vol. 148.

Sahar Jahani et al., Motion artifact detection and correction in functional near-infrared spectroscopy: a new hybrid method based on spline interpolation method and Savitzky—Golay filtering, Neurophotonics, Jan.-Mar. 2018, pp. 015003-1-015003-11, vol. 5, No. 1.

Yiming Bi et al., A local pre-processing method for near-infared spectra, combined with spectral segmentation and standard normal variate transformation, Analytica Chimica Acta, 2016, pp. 30-40, vol. 909.

Gabriela Krepper et al., Determination of fat content in chicken hamburgers using NIR spectroscopy and the Successive Projections Algorithm for interval selection in PLS regression (iSPA-PLS), Spectrochimica Acta Part A: Molecular and Biomolecular Spectroscopy, 2018, pp. 300-306, vol. 189.

Wei He et al., Validation of origins of tea samples using partial least squares analysis and Euclidean distance method with nearinfrared spectroscopy data, Spectrochimica Acta Part A: Molecular and Biomolecular Spectroscopy, 2012, pp. 399-404, vol. 86.

Zhihao Zhu et al., Accuracy improvement of boron by molecular emission with a partial least squares regression and genetic algorithm model in Laser-induced breakdown spectroscopy, Journal of Analytical Atomic Spectrometry, 2018, pp. 205-209, vol. 33, No. 2.

Xiao-Dong Huang et al., Oil source recognition technology using concentration-synchronous-matrix-fluorescence spectroscopy combined with 2D wavelet packet and probabilistic neural network, Science of The Total Environment, 2018, pp. 632-638, vol. 616-617.

Liang Shang et al., Non-destructively detecting sugar content of nectarines based on dielectric properties and ANN, Transactions of the Chinese Society of Agricultural Engineering, Sep. 2013, pp. 257-263, vol. 29, No. 17.

Zhuanwei Wang et al., Internal Quality Detection of Apples during Late Developmental Period Based on Near-infrared Spectral Technology, Chinese Journal of Agricultural Machinery, May 2018, pp. 348-354, vol. 49, No. 5.

Wenchuan Guo et al., Peach variety identification using near-infrared diffuse reflectance spectroscopy, Computers and Electronics in Agriculture, 2016, pp. 297-303, vol. 123.

Notice of Allowance of counterpart Chinese Patent Application No. 202111065948.1 dated Nov. 9, 2021.

1st Office Action of counterpart Chinese Patent Application No. 202111065948.1 dated Oct. 29, 2021.

* cited by examiner

FEATURE EXTRACTION METHOD, MODEL TRAINING METHOD, DETECTION METHOD OF FRUIT SPECTRUM

CROSS REFERENCE TO RELATED APPLICATIONS

The present application claims the benefit of Chinese Patent Application No. 202111065948.1 filed on Sep. 13, 2021, the contents of which are incorporated herein by reference in their entirety.

FIELD

The subject matter herein generally relates to non-destructive detection, and particularly to a feature extraction method, a model training method, and a detection method of fruit spectrum.

BACKGROUND

Water core disease is a physiological disease of fruits such as pineapples, at present, visible/near-infrared spectroscopy, electronic nose, and machine vision technology play an important role in smart non-destructive detection of agricultural product quality. Electronic nose and machine vision technology focus more on the features close to the appearance of agricultural products in the process of non-destructive detection, while visible/near-infrared light can penetrate the agricultural products and feature information of internal quality can be acquired, which is more suitable for smart non-destructive detection of a water core disease of pineapples. Many previous studies have shown that, the visible/near-infrared spectrum is feasible in the non-destructive detection of the internal quality such as sugar content, acidity, hardness, diseases, and insect pests of small thin-skinned fruits. However, the pineapples are relatively large fruits, and the surface of pineapple is not smooth, which may easily cause scattered noise, the quality detection is relatively difficult. Whether the visible/near-infrared spectroscopy can effectively detect the water core disease of pineapples has not been reported yet.

A Chinese patent application with an application number of CN202010745439.2 (hereinafter D1), D1 discloses a near-infrared non-destructive detection method for apple acidity based on a fusion feature wavelength selection algorithm, including: collecting spectral information of a sample marked point area of an apple, and measuring the acidity data of the sample marked point area of the apple; preprocessing the collected spectrum; selecting the feature wavelength by using a Successive Projections Algorithm (SPA) and a competitive adaptive re-weighted sampling algorithm (CARS), and fusing the feature wavelengths selected by the two algorithms; according to the spectral and acidity data corresponding to the feature wavelength after fusion, establishing a partial least squares (PLS) prediction model of apple acidity based on a calibration set, and evaluating model results based on a prediction set.

Problems existing in D1 are as follows:

1. D1 extracts features and fuses them by using SPA and CARS algorithms, although the two algorithms can sort the differences of features from different perspectives, there is a great risk of overlap among the final selection of features, which may result in redundant feature data and affect the recognition accuracy.

2. D1 verifies the effect of feature selection by using PLSR, which has certain drawbacks. The modeling process of PLSR requires parameter setting, when the feature structure is changed, the modeling parameters of PLSR should also be changed, for achieve a best modeling effect, thus, it is inconvenient to compare with different feature selections;

3. D1 does not apply the calibration set and validation set when PLSR is used for verification, so that the result may have a risk of overfitting, however, if the calibration set and validation set are applied, the amount of repeated operations may increase significantly, it is difficult to operate, and misjudgments may be caused.

A paper of "Detect Commercial Orange Juice Drinks By Fluorescence Spectroscopy Combined with PCA_ED and PLSR Methods", Spectroscopy and Spectral Analysis, August 2014, Vol. 34 No. 8, by Yangjun Hu, which analyzes the modeling process based on PLSR of commercial orange juice drinks by using Principal Component Analysis (PCA) and Euclidean Distance (ED).

However, in the process of detecting the water core disease of pineapples in D2, there are following problems:

1. D2 extracts a first and a second principal components as feature values by PCA analysis, performs clustering analysis with the distance calculation method of ED, and digitizes and quantifies the PCA graphical classification result.

2. D2 lacks the process of sorting and selecting features by SPA, there is a risk of mixing redundant features and affecting the recognition accuracy when all features are analyzed by PCA.

3. D2 classifies orange juice by using PLSR, it can be seen from the image of PCA classification result that, different samples are completely linearly separable in the two-dimensional space (i.e., a straight line can be used to completely separate the data points of different categories of samples). However, for the non-destructive detection of the water core disease of pineapples, the classification of samples of different categories has nonlinear features (i.e., a straight line cannot be used to completely separate the sample data points of different categories), thus, PLSR has certain limitations in the detection of the water core disease of pineapples.

Technical problems to be solved include how to quickly select the effective features required by the model for non-destructive detection of fruits, and how to quickly establish a non-destructive detection model for fruits.

SUMMARY

An embodiment is to provide a feature extraction method of fruit spectrum, to quickly acquire effective features with fewer samples, which is beneficial to subsequent modeling.

The feature extraction method of fruit spectrum of non-destructive detection includes: step 1: taking a vector of each wavelength point in spectra of N samples as source data, and acquiring a sorting of all vectors by processing the source data by a successive projection algorithm; the vector corresponds to the wavelength point one-to-one, the vector is a set of transmittances of each sample at the wavelength point, spectra of the samples are acquired by infrared light emitted by a spectrometer passing through the sample based on a principle of visible and/or near-infrared light transmission, the N samples are N fruits of a same category; step 2: according to the sorting of the vectors, acquiring first distribution points of each sample on a coordinate system by taking all of the vectors before a vector in a (M+1)-th position as input values of Principal Component Analysis for calculation; an abscissa of the coordinate system is first principal components, and an ordinate of the coordinate system is second principal components; M is a positive integer, and M<(N−2); step 3: acquiring classification results of the samples by destructive analysis, and acquiring a plurality of first sample categories by importing the classification results into the first distribution points acquired in step 2, the first distribution points of a same classification result form a first sample category; step 4: acquiring a first Euclidean distance between the first sample categories; step 5: according to a sorting of the wavelength points, acquiring second distribution points of each sample on the coordinate system by taking all of the vectors before a vector in a (M+2)-th position as input values of the Principal Component Analysis for calculation; step 6: acquiring a plurality of second sample categories by importing the classification results into the second distribution points acquired in step 5; step 7: acquiring a second Euclidean distance between the second sample categories; step 8: determining whether the first Euclidean distance is less than the second Euclidean distance; in response that the first Euclidean distance is less than the second Euclidean distance, determining a (M+2)-th vector to be valid data; and in response that the first Euclidean distance is not less than the second Euclidean distance, determining the (M+2)-th vector to be invalid data; the samples are pineapples.

In one embodiment, the fruits of the same category refer to fruits of a same variety, or fruits of the same variety and a same size, or fruits of the same variety, the same size, and a same place of origin, or fruits of the same variety, the same size, the same place of origin, and a same picking batch, and a wavelength band of the spectrum ranges from 400 to 1100 nm In one embodiment, the classification result is a classification of different sweetness of fruits, or a classification of different degrees of disease, or a classification of different acidity, or a classification of different hardness.

In one embodiment, the feature extraction method of fruit spectrum of non-destructive detection further includes: step 9: repeating steps 1 to 8 and gradually increasing the number of vectors, and acquiring all valid data, and acquiring all valid data, and forming a feature set including all valid data.

Another embodiment is to provide a model training method of heart core disease of pineapples of non-destructive detection based on visible and/or near infrared spectrum, the model training method includes: step 10: acquiring spectra of N samples; the spectra are acquired by infrared light emitted by a spectrometer passing through the samples based on a principle of visible and/or near-infrared light transmission; step 20: acquiring a feature set by processing the spectra acquired in step 10 using the feature extraction method; step 30: establishing a model according to the feature set by using partial least squares regression algorithm or probabilistic neural network algorithm; step 40: training the model by a number of samples.

In one embodiment, a wavelength band of the spectrum ranges from 400 to 1100 nm.

In one embodiment, step 10 further includes: filtering out noise fluctuations in spectral signals and correcting scattered noise.

Another embodiment is to provide a non-destructive detection method of heart core disease of pineapples, the non-destructive detection method includes: detecting whether a pineapple has a water core disease according to the established model.

In one embodiment, a spectrometer is used in the method for detection, the spectrometer includes: a light source; a light receiver; and a support platform arranged between the light source and the light receiver; a light baffle plate is arranged between the light receiver and the support platform, a light hole is formed on a position of the light baffle directly facing the light receiver, the number of lamps of the light source is six, the lamps are arranged on three layers, two lamps are arranged on a upper layer, two lamps are arranged on a middle layer, and two lamps are arranged on a lower layer, the lamps on the middle layer is at a same height as the light receiver.

BRIEF DESCRIPTION OF THE DRAWINGS

In order to clearly explain technical solutions of embodiments of the present disclosure or in the related art, drawings used in the description of the embodiments or the related art are briefly described below. Obviously, the drawings as described below are merely some embodiments of the present disclosure. Based on these drawings, other drawings can be obtained by those skilled in the art without paying creative efforts.

DETAILED DESCRIPTION

Figure 1A:
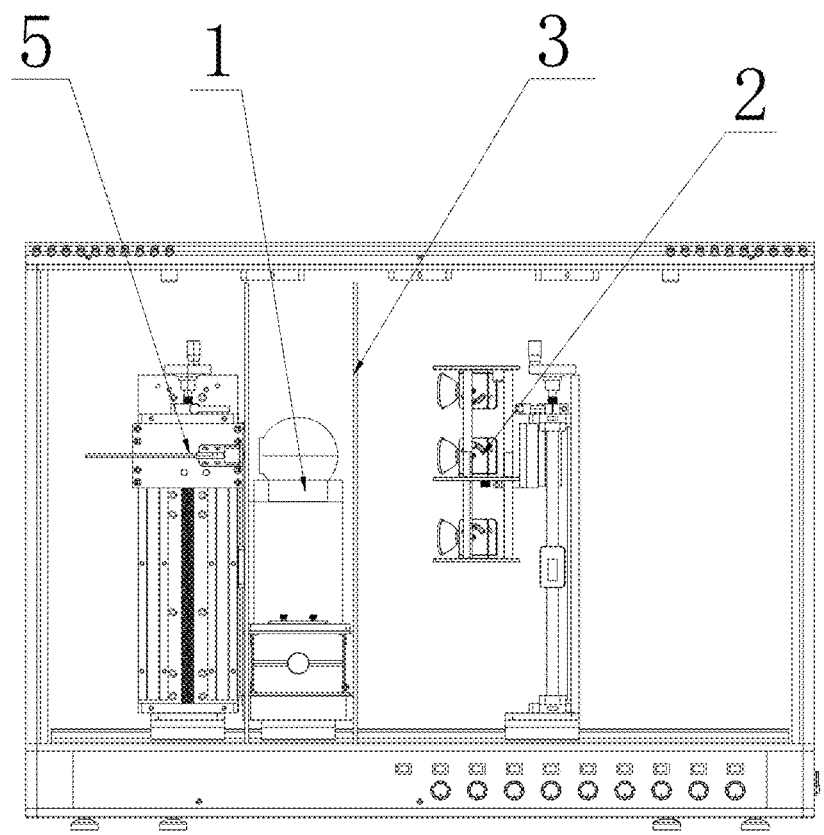
FIG. 1A is a front view of a platform in Embodiments 1-3 according to the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the detailed description, many other combinations of the disclosed features are also possible. Unless specifically limited, any feature or element of any embodiment may be used in combination with or in place of any other feature or element of any other embodiment.

When describing representative embodiments, the specification may have presented methods and/or processes as a specific sequence of steps. However, to the extent that the method or process does not depend on the specific order of steps described in the present disclosure, the method or process should not be limited to the specific order of steps described. As understood by those of ordinary skills in the art, other orders of steps are also possible. Therefore, the specific order of steps set forth in the specification should not be interpreted as limitation to the claims. In addition, the claims for the method and/or process should not be limited to the steps performed in the written order, and those of skilled in the art may readily understand that these orders may vary and still remain within the essence and scope of the embodiments of the present disclosure.

Unless otherwise defined, technical terms or scientific terms used in the embodiments shall have common meanings as construed by those of ordinary skills in the art to which the present disclosure pertains. The words "first", "second" and the like used in the embodiments of the present disclosure do not represent any order, quantity or importance, but are merely used to distinguish among different components. The words "include", "contain" or the like mean that elements or articles appearing before the words cover elements or articles listed after the words and their equivalents, without excluding other elements or articles. The words "connect", "link" or the like are not limited to physical or mechanical connection, but may include electrical connection, whether direct or indirect.

The vocabulary involved in the detailed description includes: Principal Component Analysis (PCA), Polynomial smoothing filtering (Savitzky Golay, SG), Standard Normal Variate (SNV), Successive Projections Algorithm (SPA), Euclidean Distance (ED), Partial Least Squares Regression (PLSR), and Probabilistic Neural Network (PNN).

Figure 1B:
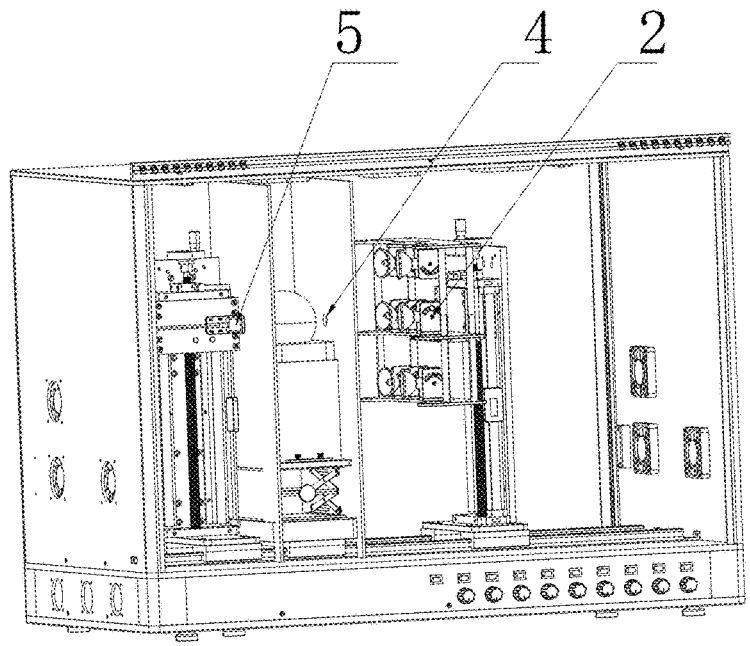
FIG. 1B is a stereogram view of the platform in Embodiments 1-3 according to the present disclosure.

First part: Overview
1 Materials and Methods
1.1 Construction of Spectral Detection Platform Referring to FIGS. 1A and 1B, a platform for non-destructive detection of pineapple quality built by the present disclosure is shown. When sampling, the pineapple is arranged in a lie flat manner on a tray 1 of an objective table, the tray 1 can fix the pineapple, and experimental results can also provide a better reference for a dynamic detection of an assembly line. In order to prevent the light from being directly received by a light receiver without passing through the pineapple and causing noise interference, the light emitted by a light source 2 is required to pass through a light inlet hole 4 of a light baffle plate 3, and after passing through the sample, the light can be received after passing through the light outlet hole. The light receiver can be a receiving optical fiber. The detection process is carried out in a dark box, and windows of the box are shielded by curtains. In order to find better sampling parameters of the pineapple spectrum, the parameters of the platform including power of the light source, sizes of the light inlet hole and light outlet hole, and distances between any two of the light source, the pineapple sample, and a receiving optical fiber 5, the parameters are adjustable. The wattage of the light source can be adjustable from 0 to 90 W, for example, the light source may include nine halogen lamps with a wattage of 100 W, the sizes of the light inlet hole and the light outlet hole on the light baffle plate may be determined by being changed and tested many times, and the distances between any two of the light source, the pineapple, and the receiving optical fiber 5 may be adjusted by a sliding table.

Figure 14:
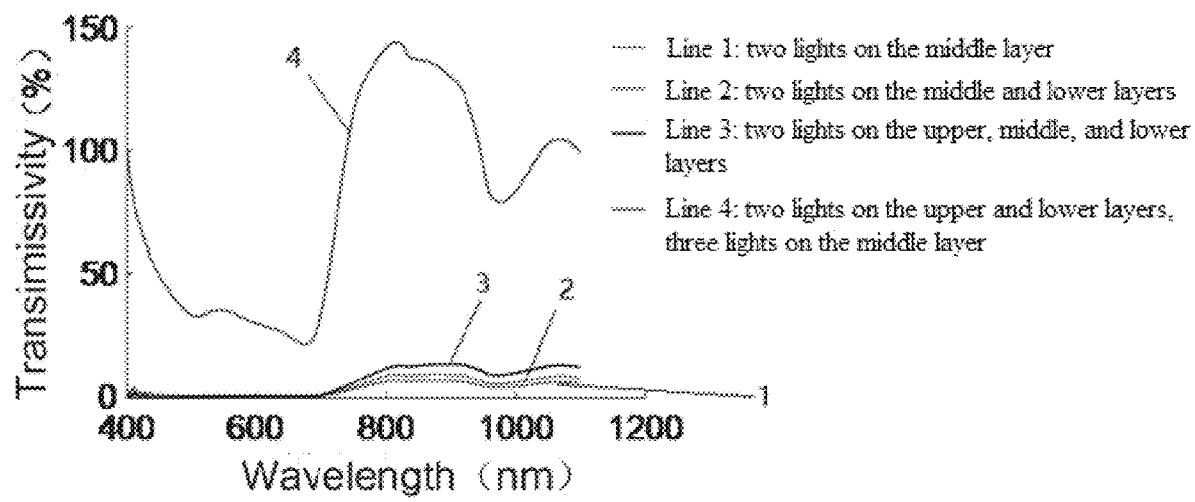
FIG. 14 illustrates spectrograms under conditions of different numbers of light sources.

The lamp with the wattage of 100 W is applied because the lamp with such power not only has better light intensity for transmitting the pineapple, but also has a better service life (e.g., theoretical duration can be 1000 hours). If the wattage of the lamp is further increased, the lifetime may be attenuated, and the stability may not be satisfied in actual use, so that it is a better choice to increase the number of light sources. Referring to FIG. 14, in order to select the number and distribution of lamps, data of a same pineapple is acquired and compared using three layers (i.e., an upper layer, a middle layer, and a lower layer) of light source. When the middle two lamps on each of the upper layer, the middle layer, and lower layer are turned on, the transmittance is greater than other lamp combinations. If other lamps on any of the upper layer, the middle layer, and lower layer are turned on, some light may be directly received by the receiving optical fiber without passing through the pineapple due to the irradiation angle, which may result in light leakage, at this time, the transmittance is greater than 100%, data errors may be caused.

Figure 15:
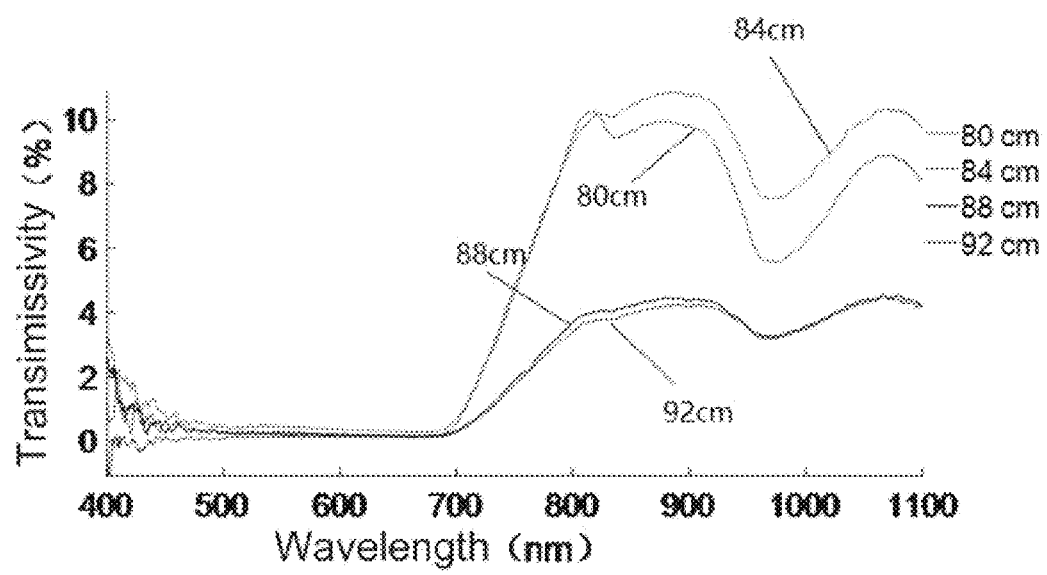
FIG. 15 illustrates spectrograms under conditions of different light source spacings.

The light intensity may be 600 W, which is the wattage of six lamps including each two lamps on the upper layer, the middle layer, and the lower layer. Referring to FIG. 15, when the distance between the light source and the light inlet hole increases from 80 cm to 84 cm, the transmittance is enhanced, when the distance is further increased, the transmittance gradually decreases, which conforms to the principle of pinhole imaging.

In one embodiment, an angle formed by connection lines between each two lamps on the same layer and the light inlet hole can be 30 degrees, the distance between the two lights on the adjacent layers can be 15 cm, a midperpendicular of the connection line between the two lights on any layer passes through the light inlet hole.

Referring to FIGS. 14 and 15, it can be seen that, when there are both two ramps on the upper, middle, and lower layers, and the distance between the light source and the light inlet hole is 84 cm, the light effect is optimal, the transmittance is the highest and there is no light leakage, the noise signal is less, a signal-to-noise ratio is significantly optimized, thereby avoiding loss of key features in the spectrum and recognition failure etc., and ensuring reliability of the detection.

The other end of the receiving optical fiber is connected to two spectrometers covering different wavelength bands, two spectrometers includes QE pro and NIR QUESR (both produced by Ocean Optics, USA), which can cover the wavelength bands range from 400 to 1100 nm and 900 to 1700 nm, respectively. If two spectrometers are utilized in combination, a total of spectral information with the wavelength band ranges from 400 to 1700 nm can be covered.

1.2 Pineapple Samples

The pineapples used in the detection are picked from a farm in Xuwen County, Zhanjiang City, Guangdong Province, in April 2021, the variety is "Bali", the number of samples is 100, after being picked, sampling and detecting are carried out in a detection room built near the farm immediately.

1.3 Information Acquisition of Pineapple Samples

After repeated debugging, the optimal acquisition parameters for the visible/near-infrared spectrum of pineapples are set as follows: an integration time of the spectrometers QE pro and NIR QUEST are 600 and 2000 ms respectively; the distance between the receiving optical fiber and the pineapple tray is 30 mm; the distance between the light inlet hole and the light source is 84 mm; the wattage of the light source is 600 W; the pineapple tray is located in the center of the tray, and the light source, the light inlet hole, the pineapple, the light outlet hole, and the receiving optical fiber are arranged at a same level.

After the spectral information of the pineapple is acquired, whether the pineapple has a water core disease is judged by manpower. The classification result of the sample is acquired by performing destructive detection on the sample.

In other embodiments, the disease may also include slight core disease, etc. In some cases, the disease may become a unique selling point of fruits, for example, the apples with the water core disease are actually the sugar core apples. Therefore, from another aspect, the method provided in the present disclosure can also be applied as an effective means for the detection of some characteristic varieties of fruits.

At present, there is no ranking method for the water core disease of pineapples. The pineapple is cut in half lengthwise, then cut into 12 small pieces and arranged on the table, the occurrence of water core disease of pineapples is observed and recorded comprehensively. A total of 56 samples with no water core disease, 21 samples with slight water core disease, and 23 samples with heavy water core disease are acquired, respectively.

1.4 Data Processing and Analysis

PCA is applied to determine the classification effect of pineapples with different water core degree; reducing the noise fluctuation caused by the long optical path and low signal-to-noise ratio of large fruit spectral sampling by using SG filtering, the filtering effect is affected by the order of polynomial and the number of smoothing points; reducing the scattered noise caused by the extremely rough skin of pineapple by using SNV; extracting spectral features by using SPA algorithm, PCA, and ED algorithm, sorting spectral features according to the size of the difference by using SPA, the number of features is gradually increased from 2, performing PCA processing on the spectral features, calculating the distances between the center points of different categories by using ED, and determining the necessity of adding features according to the distances. Determining a calibration and a validation set for further modeling and recognizing by using PLSR and PNN, 38 samples with no water core disease, 14 samples with slight water core disease, and 15 samples with heavy water core disease are randomly selected as the calibration set, respectively, and the remaining 19 samples with no water core disease, 7 samples with slight water core disease, and 8 samples with heavy water core disease are taken as the validation set. Expected outputs corresponding to different water core degree are set to be 1, 2, and 3, the expected outputs corresponding to no water core is 1, the expected outputs corresponding to slight water core is 2, and the expected outputs corresponding to heavy water core is 3. The detection effect of PLSR is greatly affected by the selection of the number of features FN after dimensionality reduction, and the output result is a decimal, and is expressed by a fit coefficient $R^2$ between the predicted value and the actual value, and root mean square error (RMSE), the detection effect of PNN is greatly affected by a diffusion speed Spread value, and the output result is an integer, which can be directly expressed by the accuracy rate. In order to further calculate the recognition accuracy of PLSR, the output result of PLSR is rounded to the nearest integer, no water core is output if the result is less than or equal to 1, slight water core is output if the result is equal to 2, and heavy water core is output if the result is greater than or equal to 3.

The PCA can refer to the literature: Pořízka Pavel, Klus Jakub, Képeš Erik, et al. On the utilization of principal component analysis in laser-induced breakdown spectroscopy data analysis, a review[J]. Spectrochimica Acta Part B: Atomic Spectroscopy, 2018, 148:65-82.

The SG algorithm can refer to literature: Jahani Sahar, Setarehdan Seyed K., Boas David A., et al. Motion artifact detection and correction in functional near-infrared spectroscopy: a new hybrid method based on spline interpolation method and Savitzky—Golay filtering[J]. Neurophotonics, 2018,5(1):15003.

The SNV algorithm can refer to the literature: Bi Yiming, Yuan Kailong, Xiao Weiqiang, et al. A local pre-processing method for near-infrared spectra, combined with spectral segmentation and standard normal variate transformation[J]. Analytica chimica acta, 2016, 909:30-40.

The SPA algorithm can refer to the literature: Krepper Gabriela, Romeo Florencia, de Sousa Fernandes David Douglas, et al. Determination of fat content in chicken hamburgers using NIR spectroscopy and the Successive Projections Algorithm for interval selection in PLS regression (iSPA-PLS)[J]. Spectrochimica Acta Part A: Molecular and Biomolecular Spectroscopy, 2018, 189:300-306.

The ED algorithm can refer to the literature: He Wei, Zhou Jian, Cheng Hao, et al. Validation of origins of tea samples using partial least squares analysis and Euclidean distance method with near-infrared spectroscopy data[J]. Spectrochimica Acta Part A: Molecular and Biomolecular Spectroscopy, 2012, 86:399-404.

The PLSR algorithm can refer to the literature: Zhu Zhihao, Li Jiaming, Guo Yangmin, et al. Accuracy improvement of boron by molecular emission with a genetic algorithm and partial least squares regression model in laser-induced breakdown spectroscopy[J]. Journal of Analytical Atomic Spectrometry, 2018, 33(2):205-209.

The PNN algorithm can refer to the literature: Huang Xiao-Dong, Wang Chun-Yan, Fan Xin-Min, et al. Oil source recognition technology using concentration-synchronous-matrix-fluorescence spectroscopy combined with 2D wavelet packet and probabilistic neural network[J]. Science of The Total Environment, 2018, 616:632-638.

Second Part: Specific Detection Process

Embodiment 1

Figure 2A:
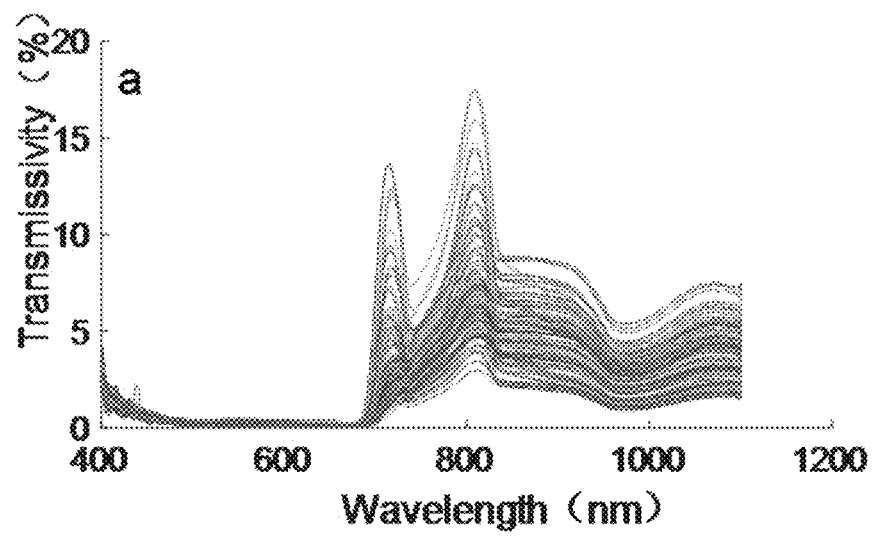
FIG. 2A is an original spectrum of Embodiment 1 according to the present disclosure.
Figure 2B:
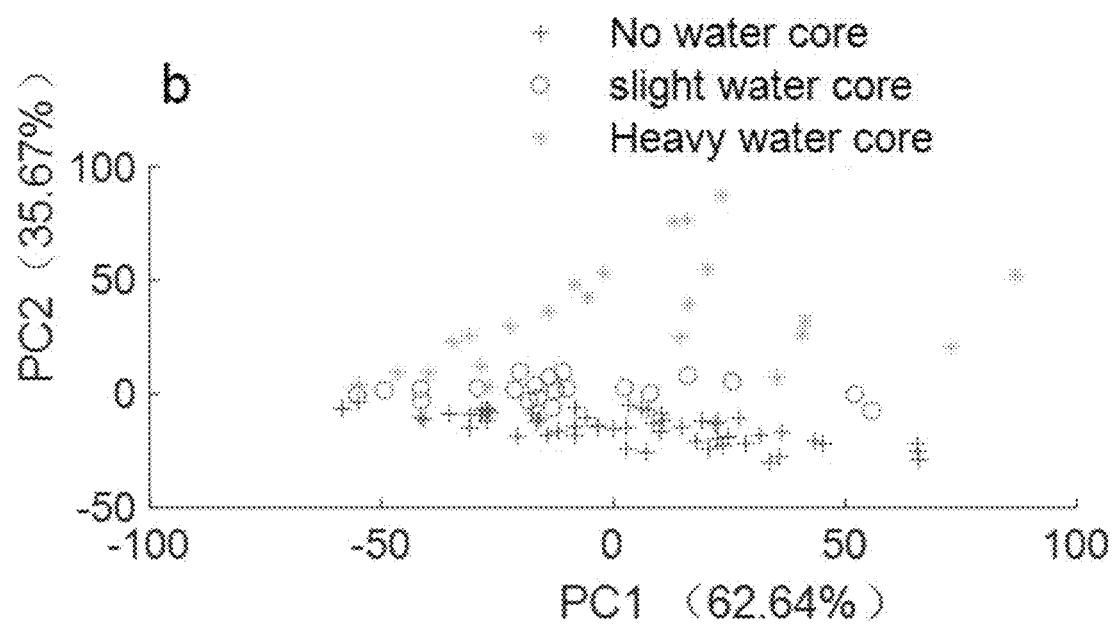
FIG. 2B is a schematic diagram of PCA recognition of water core degree by 400-1100 nm raw spectral data in Embodiment 1 according to the present disclosure.

Detection of Water Core Disease of Pineapples by 400-1100 nm Spectrum 2.1.1 Original Data and PCA Recognition Referring to FIG. 2A, raw spectra with a wavelength band of 400-1100 nm of the pineapple samples is illustrated, slight noise fluctuations appear in the data after a wavelength of 1000 nm. Referring to FIG. 2B, the PCA recognition results of water core degree of pineapples corresponding to 400-1100 nm raw data are illustrated. A contribution rate of first principal components (PC1) is 62.64%, and a contribution rate of second principal components (PC2) is 35.67%, and a total contribution rate is 98.31%. Pineapple samples with different water core degree can be distinguished, however, the Euclidean distance is small, the dispersion degree is high, and the clustering performance is poor.

2.1.2 SG Filter, SNV Correction, and PCA Recognition

Figure 3A:
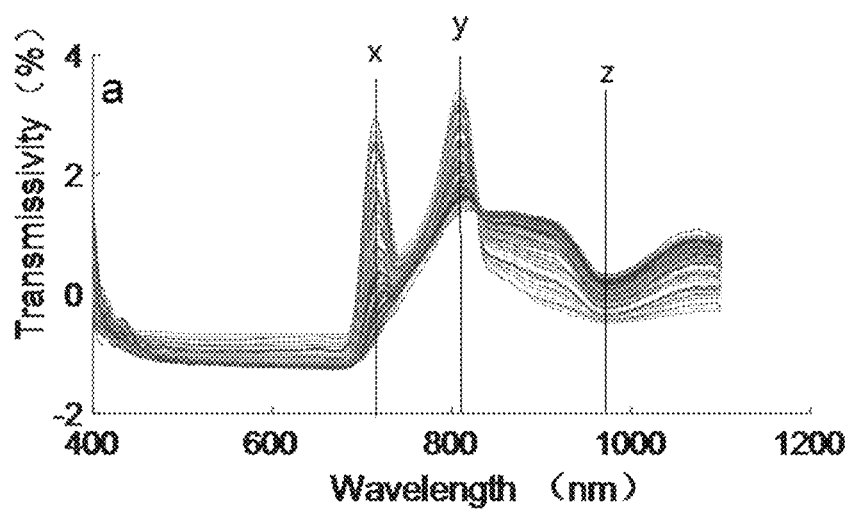
FIG. 3A is a spectrum acquired by filtering out noise fluctuations and correcting scattered noise in Embodiment 1 according to the present disclosure.
Figure 3B:
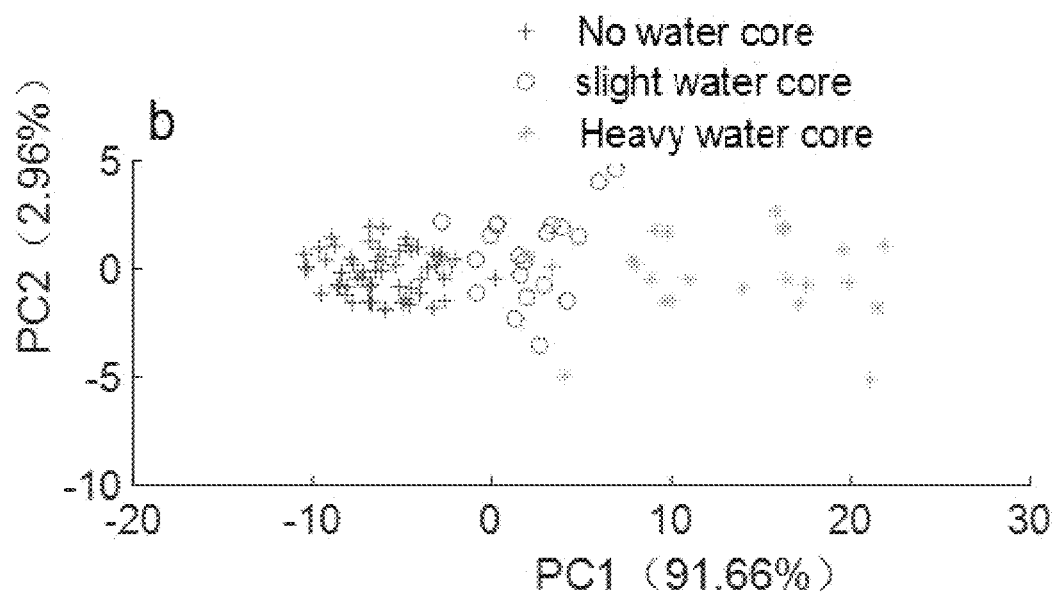
FIG. 3B is a schematic diagram of PCA recognition of water core degree by SG and SNV processing a spectrum with a wavelength band of 400-1100 nm in Embodiment 1 according to the present disclosure.

In order to improve the quality of the spectral data, after repeated experiments, the third-order 23-point SG processing can better filter out the noise fluctuations in the spectral data, and then the scattered noise in the spectral signals is corrected by using the SNV, and the processed pineapple spectrum signals are shown in FIG. 3A. Referring to FIG. 3B, the PCA recognition results of the water core degree of pineapples based on the processed spectral signals are illustrated. The contribution rates of PC1 and PC2 are 91.66 and 2.96%, respectively, and the total contribution rate is 94.62%. Compared with FIG. 2B, PCA can also effectively distinguish different water core degree, and the clustering performance of sample data points with a same category is significantly enhanced, however, there is a small amount of data point overlap between different samples, and there is a risk of misjudgment in actual classification.

2.1.3 Feature Extraction By SPA, PCA, and ED

Figure 4:
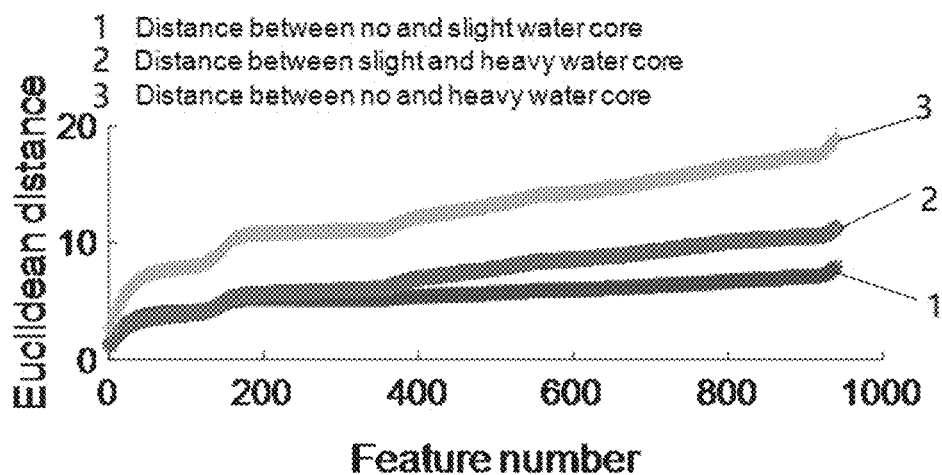
FIG. 4 is an analysis diagram of effect of SPA, PCA, and ED on 400-1100 nm spectrum features in Embodiment 1 according to the present disclosure.

In order to clarify whether each feature has a positive effect on classification and recognition, referring to FIGS. 3B and 4, the analysis results of the effect of SPA, PCA, and ED on the spectral features are illustrated, FIG. 3B is a coordinate diagram calculated by the PCA. FIG. 4 is a coordinate diagram for ED judgment. After sorting the feature effects from large to small by using SPA, the number of features was gradually increased in order and PCA analysis is performed, and the ED between data points with different water core degree gradually increased. It can be seen that, all the features are beneficial in the classification and recognition.

Figure 16:
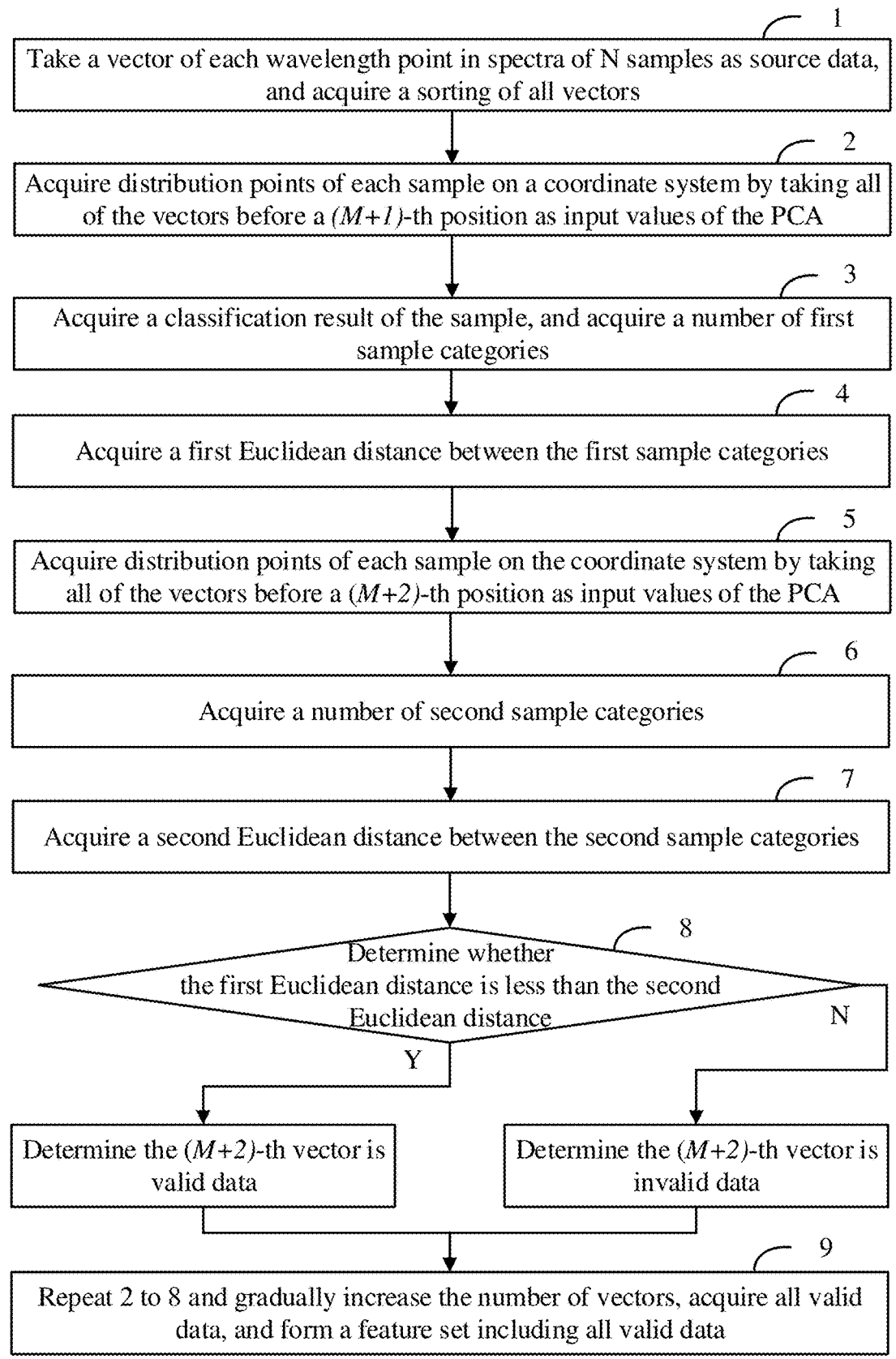
FIG. 16 illustrates a flowchart of an embodiment of a feature extraction method of fruit spectrum according to the present disclosure.

Referring to FIG. 16, analysis on effects of spectral features by SPA, PCA, and ED is as follows:

At step 1, taking a vector of each wavelength point in spectra of N samples as source data, and acquiring a sorting of all vectors by processing the source data by using the SPA algorithm In one embodiment, the vector corresponds to a wavelength point one-to-one, and the vector is a set of transmittances of each sample at the wavelength point. The wavelength point is the point in the spectrum of the sample as shown in FIG. 3A, each point corresponds to a wavelength.

In one embodiment, the spectrum of the sample is acquired by a spectrometer based on the principle of visible and/or near-infrared light transmission.

In one embodiment, the N samples are N fruits of the same category.

Referring to FIG. 3A, an axis x includes wavelength points with a wavelength of 720 nm, and all the transmittances on the axis x are formed into a vector of the wavelength points with the wavelength of 720 nm. An axis y includes wavelength points with a wavelength of 815 nm, and all the transmittances on the axis y are formed into a vector of the wavelength points with the wavelength of 815 nm. An axis z includes wavelength points with a wavelength of 980 nm, and all the transmittances on the axis z are formed into a vector of the wavelength points with the wavelength of 980 nm.

In one embodiment, a number of samples are a number of fruits of the same category.

The fruits of the same category refer to fruits of the same variety, or fruits of the same variety and size, or fruits of the same variety, size, and place of origin, or fruits of the same variety, size, place of origin, and picking batches.

In one embodiment, as mentioned above, the "Bali" pineapples of the same variety, the same size, the same place of origin, and the same picking batch are applied in the detection.

Figure 17:
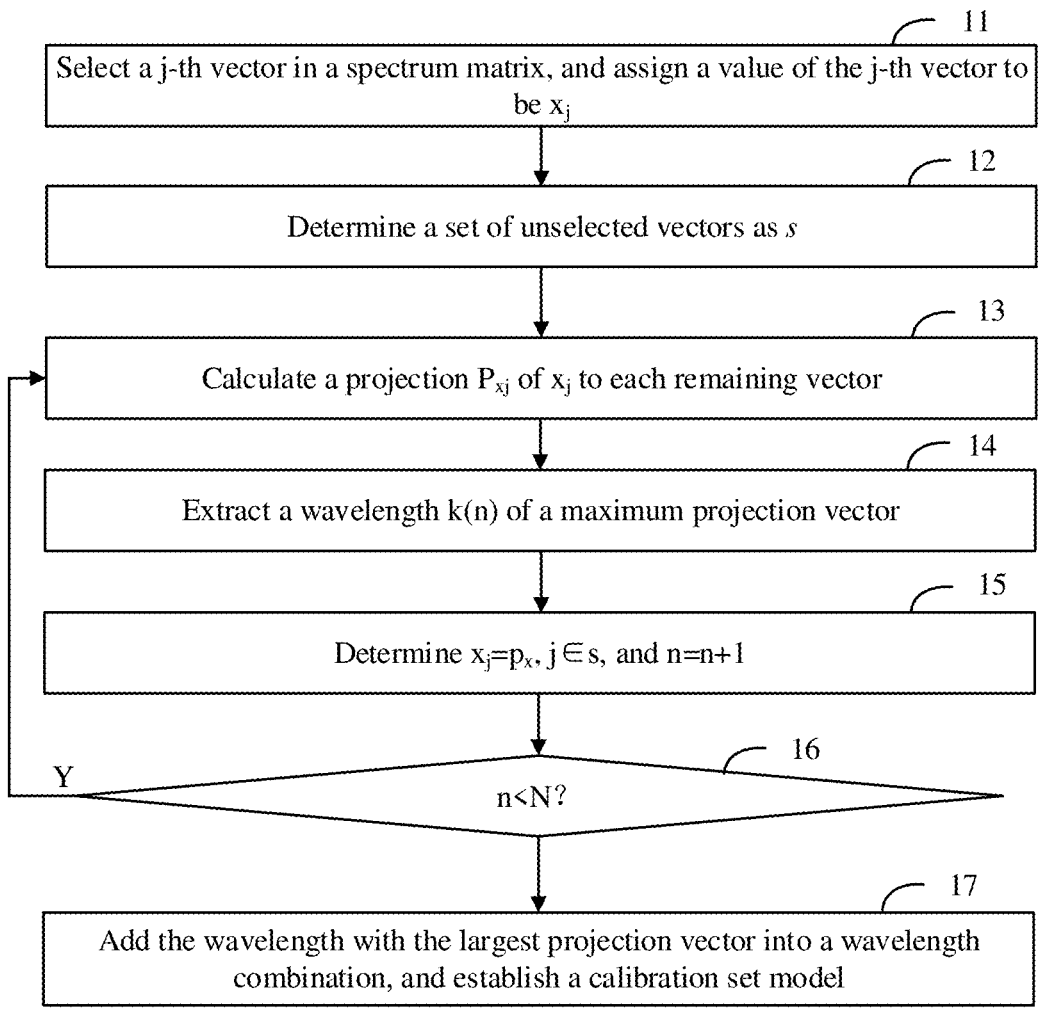
FIG. 17 illustrates a flowchart of an embodiment of acquiring an ordering of all vectors by processing the source data by the successive projection algorithm according to the present disclosure.

Referring to FIG. 17, the calculation process of step 1 in the electronic device is as follows:

The number of samples is N, a spectrum matrix have J columns, and J is equal to the number of wavelength points; each vector in the spectrum matrix constitutes a column;

At sub-step 11, a first iteration, selecting a j-th vector in the spectrum matrix, and assigning a value of the j-th vector to be $x_j$, and $x_j$ is recorded as $x_{k(0)}$; $1 \leq j \leq J$; $x_{k(0)}$ is an initial iteration vector.

At sub-step 12, determining a set of unselected vectors as s;

$$s=\{j, 1 \leq j \leq J, j \notin \{k(0), \ldots, k(n-1)\}\};$$

At sub-step 13, calculating a projection $P_{xj}$ of $x_j$ to each remaining vector, the remaining vectors are the vectors other than the j-th vector; the projection $P_{xj}$ is calculated according to the following equation:

$$P_{xj}=x_j-(x_j^T x_{k(n-1)})x_{k(n-1)}(x_{k(n-1)}^T x_{k(n-1)})^{-1}, j \in s;$$

At sub-step 14, extracting a wavelength k(n) of a maximum projection vector; the wavelength k(n) is extracted according to the following equation:

$$k(n)=\arg(\max(\|P_{(x_j)}\|), j \in s)$$

At sub-step 15, determining $x_j = p_x$, $j \in s$, and $n = n+1$.

At sub-step 16, if n<N after the count increase in sub-step 15, the process goes back to sub-step 13;

At sub-step 17, adding the wavelength with a largest projection vector into a wavelength combination, and a final selected wavelength variable is {k(n), n=0, . . . , N−1}; cross-validation analysis is performed once per iteration, a linear relationship between each newly selected wavelength and a previous one is the smallest, the k(n) corresponding to the smallest SEP is the final selected wavelength combination. Finally, a correction set model is established according to the set of optimal wavenumber points; the correction set model is the sorting of all vectors.

At step 2, according to the sorting of the vectors, acquiring distribution points of each sample on a coordinate system as shown in FIG. 3B by taking all of the vectors before a (M+1)-th position as input values of the PCA for calculation; the abscissa of the coordinate system is the first principal components, and the ordinate of the coordinate system is the second principal components; M is a positive integer, and $M<(N-2)$;

At step 3, acquiring a classification result of the sample by a destructive analysis, and acquiring a number of first sample categories by importing the classification result into the distribution points acquired at step 2, the distribution points of the same classification result constitute a first sample category.

At step 4, acquiring a first Euclidean distance between the first sample categories.

At step 5, according to a sorting of the wavelength points, acquiring distribution points of each sample on the coordinate system by taking all of the vectors before a (M+2)-th position as input values of the PCA for calculation.

At step 6, acquiring a number of second sample categories by importing the classification result into the distribution points acquired at step 5.

At step 7, acquiring a second Euclidean distance between the second sample categories.

At step 8, determining whether the first Euclidean distance is less than the second Euclidean distance. If the first Euclidean distance is less than the second Euclidean distance, the (M+2)-th vector is valid data; if the first Euclidean distance is not less than the second Euclidean distance, the (M+2)-th vector is invalid data.

At step 9, repeating steps 2 to 8 and gradually increasing the number of vectors, and acquiring all valid data, referring to FIG. 4, in one embodiment, and a feature set including all valid data is formed.

2.1.4 Modeling by PLSR and PNN Detection

Figure 18:
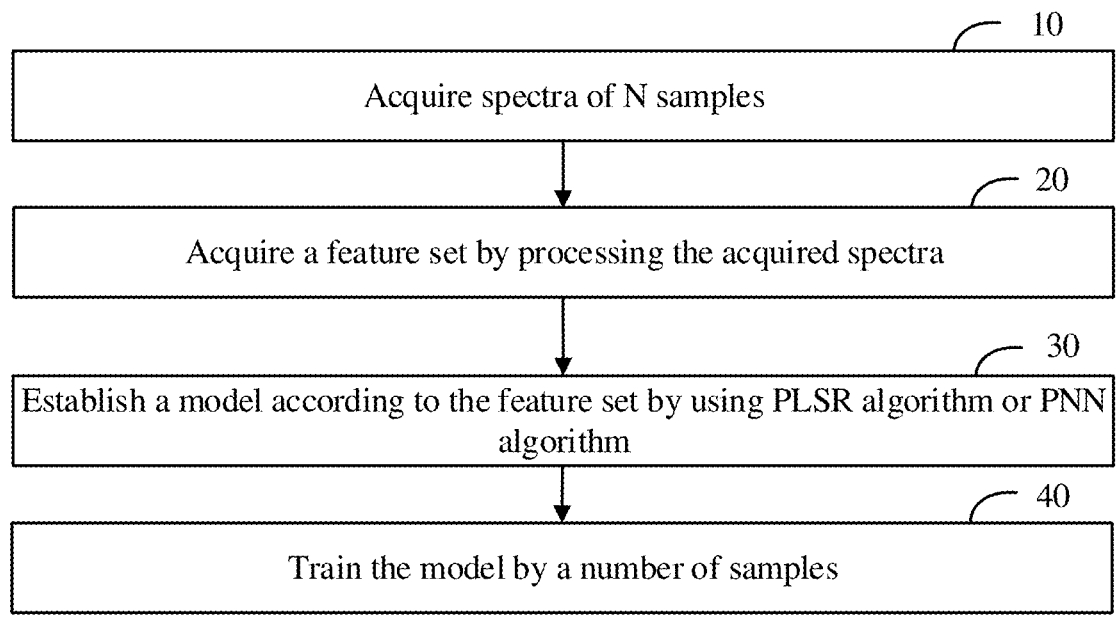
FIG. 18 illustrates a flowchart of an embodiment of a model training method of fruit spectrum according to the present disclosure.

Referring to FIG. 18, a method of modeling by PLSR and PNN Detection is as follows:

At step 10, acquiring the spectra of N samples.

In one embodiment, the spectrum of the sample is acquired by a spectrometer based on the principle of visible and/or near-infrared light transmission, a number of samples are a number of fruits of the same category.

At step 20, acquiring a feature set by processing the acquired spectra by the method described in 2.1.3.

At step 30, establishing a model according to the feature set by using the PLSR algorithm or the PNN algorithm At step 40, training the model by a number of samples.

In one embodiment, in the training process, the samples can be divided into a calibration set and a validation set, the calibration set is used to train the model, and the validation set is used to adjust the parameters of the model.

As a further optimization, the samples can also be divided into a calibration, a validation set, and a test set. The test set is used to evaluate generalization performance of the model after the training of the calibration and parameter adjustment of the validation set, after passing the evaluation, the model that is delivered to production is established by inputting the test set to the model for training.

Figure 5:
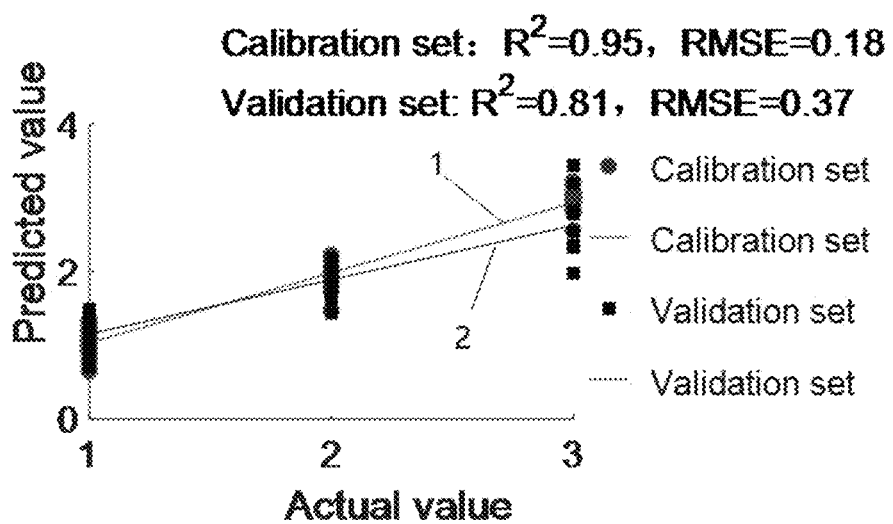
FIG. 5 is a diagram of detection results of water core disease of pineapples by 400-1100 nm spectrum combined with PLSR in Embodiment 1 according to the present disclosure.

In detail, referring to FIG. 5, the detection results of water core disease of pineapples acquired according to the calibration set and validation set by using PLSR are illustrated, respectively. In FIG. 5, the circle points represent the coordinate points formed by the predicted values and the actual values of the samples according to the calibration set, the square points represent the coordinate points formed by the predicted values and the actual values of the samples according to the validation set, and the line 1 represents the linear fitting trend between the predicted values and the actual values of the water core degree of the samples in the calibration set, the line 2 represents the linear fitting trend between the predicted values and the actual values of heart core degree of the samples in the validation set.

Due to a large number of circle points and square points, the circle points and square points may not be seen clearly in FIG. 5, the line 1 and the line 2 are drawn by computer software according to the value of each point, $R^2$ and RMSE are accurate and true.

After repeated training, the modeling parameter FN of PLSR is determined to 11, back-judgment $R^2$ and RMSE for the calibration set are 0.95 and 0.18, respectively, and detection $R^2$ and RMSE for the validation set are 0.81 and 0.37, respectively. After rounding the output result, the accuracy rate of back-judgment for the calibration set is 98.51% (i.e., 1 heavy water core is misjudged to be slight water core), and the detection accuracy rate for the validation set is 88.24% (i.e., 1 slight water core is misjudged to be no water core; 3 heavy water core were misjudged to be slight water core).

Modeling and detecting the water core disease of pineapples according to the calibration set and the validation set by using the PNN, after repeated training, the parameter Spread value of PNN model is set to 1.2, the accuracy rate of back-judgment of the PNN model for the calibration set is 98.51% (i.e., 1 heavy water core is misjudged to be slight water core), and the detection accuracy rate for the validation set is 91.18% (i.e., 1 slight water core is misjudged to be no water core; two heavy water cores are misjudged to be slight water cores), thus, the detection is effective.

Embodiment 2

Figure 6A:
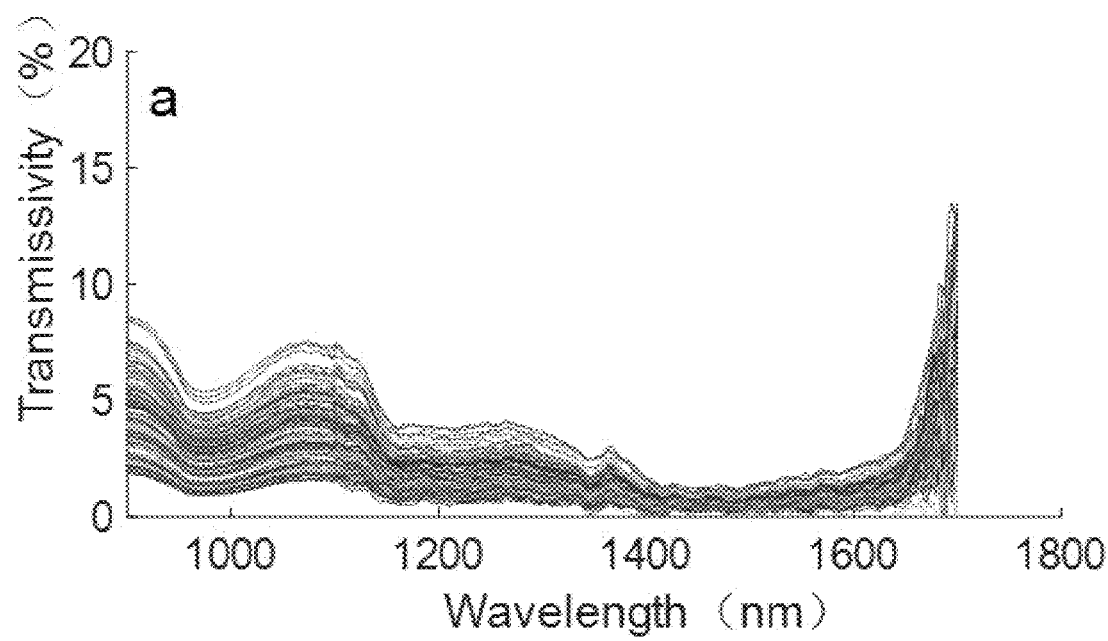
FIG. 6A is an original spectrum in Embodiment 2 according to the present disclosure.
Figure 6B:
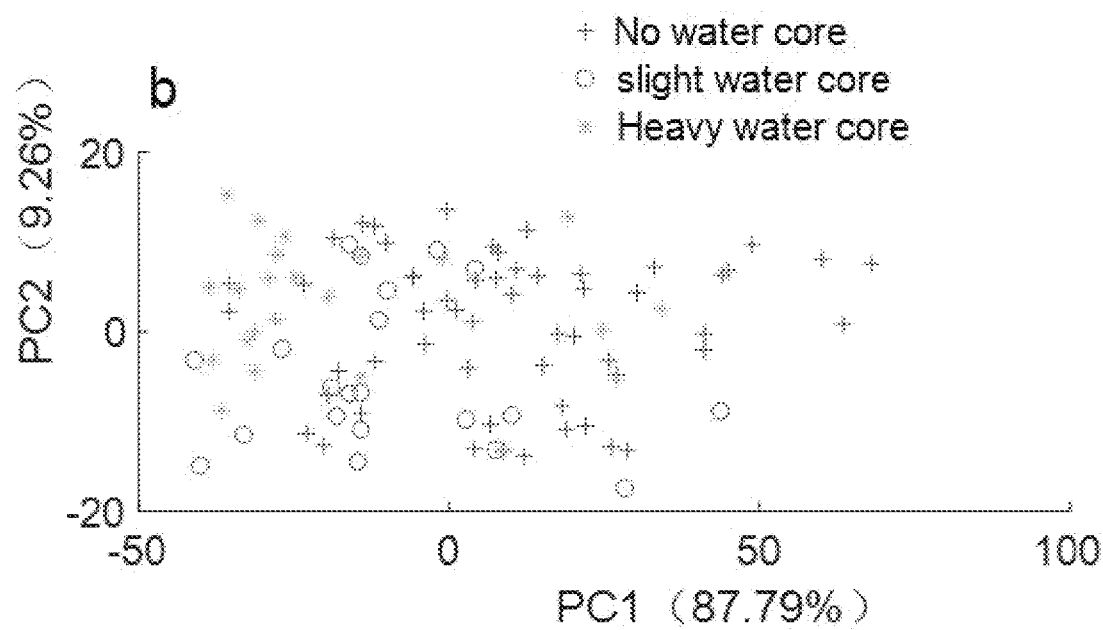
FIG. 6B is a schematic diagram of PCA recognition of water core degree by 900-1700 nm raw spectral data in Embodiment 2 according to the present disclosure.

Detection of water core disease of pineapples by 900-1700 nm spectrum 3.1.1 Original Data and PCA Recognition Referring to FIG. 6A, raw spectra with a wavelength band of 900-1700 nm of the pineapple samples is illustrated, obvious noise fluctuations appear in the data, and increase with increase of the wavelength. Referring to FIG. 6B, the PCA recognition results of water core degree of pineapples corresponding to 900-1700 nm raw data are illustrated. The contribution rate of first principal components (PC1) is 87.79%, and the contribution rate of second principal components (PC2) is 9.26%, and the total contribution rate is 97.05%. Pineapple samples with different water core degree cannot be distinguished.

3.1.2 SG Filter, SNV Dorrection, and PCA Recognition

Figure 7A:
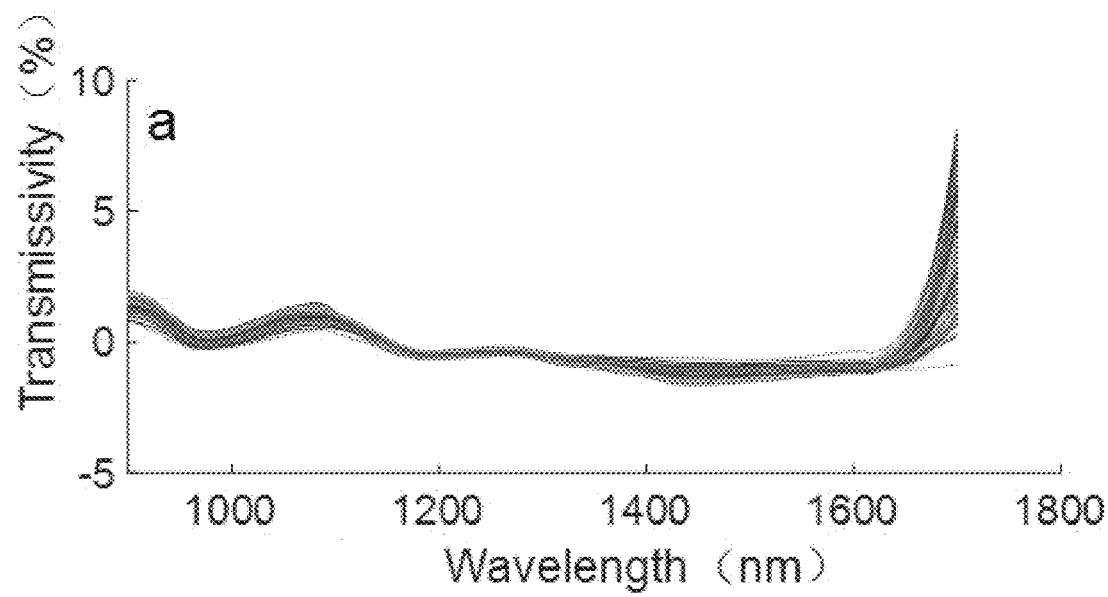
FIG. 7A is a spectrum acquired by filtering out noise fluctuations and correcting scattered noise in Embodiment 2 according to the present disclosure.
Figure 7B:
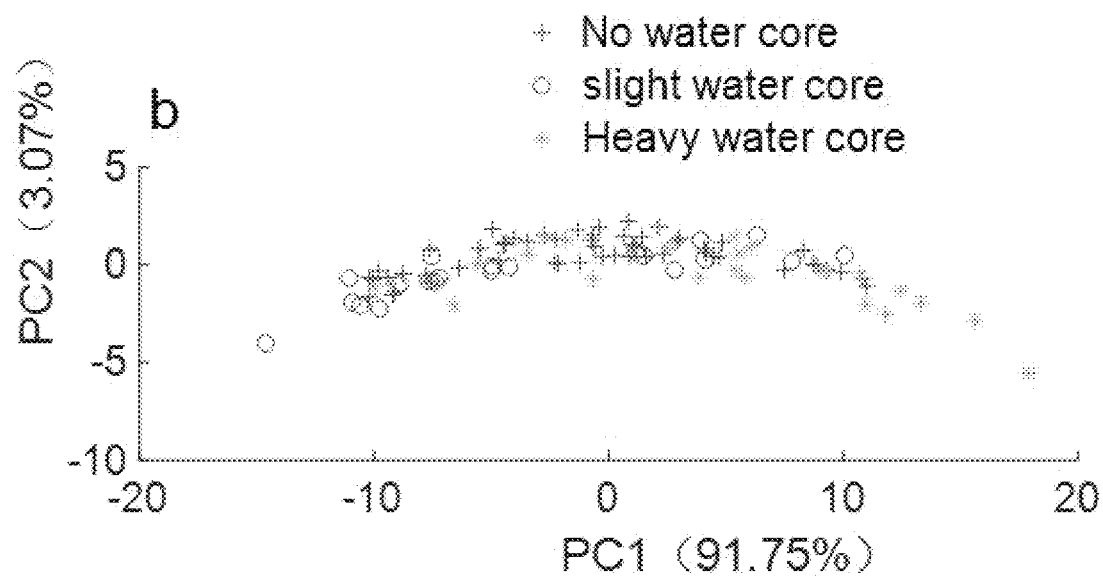
FIG. 7B is a schematic diagram of PCA recognition of water core degree by SG and SNV processing a spectrum with a wavelength band of 900-1700 nm in Embodiment 2 according to the present disclosure.

In order to improve the quality of the spectral data, after repeated experiments, the third-order 41-point SG processing can better filter out the noise fluctuations in the spectral data, and then the scattered noise in the spectral signals is corrected by using the SNV, and the processed pineapple spectrum signals are shown in FIG. 7A. Referring to FIG. 7B, the PCA recognition results of the water core degree of pineapples based on the processed spectral signals are illustrated. The contribution rates of PC1 and PC2 are 91.75% and 3.07%, respectively, and the total contribution rate is 94.82%. PCA cannot effectively distinguish different water core degree, however, compared with FIG. 6B, the clustering performance of sample data points is significantly enhanced.

3.1.3 Feature Extraction By SPA, PCA, and ED

Figure 8:
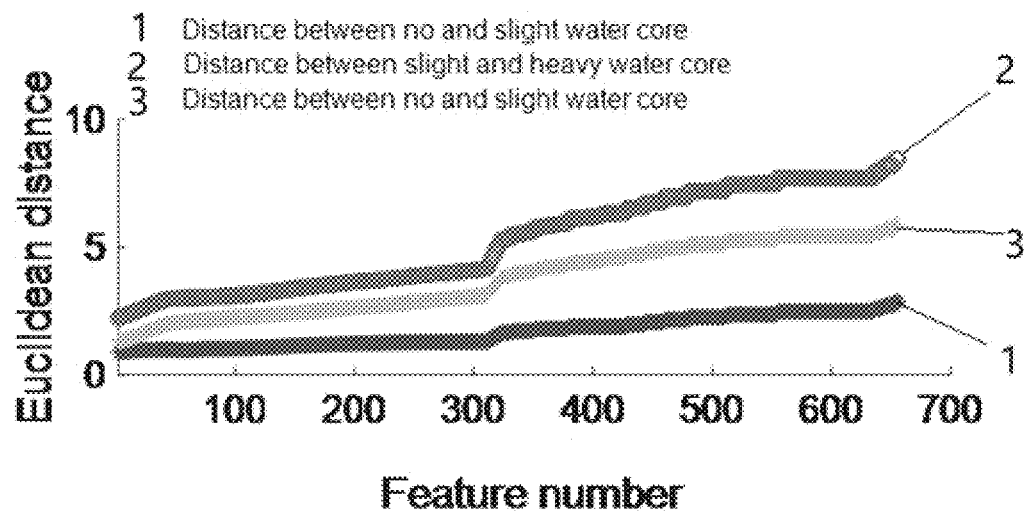
FIG. 8 is an analysis diagram of effect of SPA, PCA, and ED on 900-1700 nm spectrum features in Embodiment 2 according to the present disclosure.

Referring to FIGS. 7B and 8, the analysis results of the effect of SPA, PCA, and ED on the spectral features are illustrated. After sorting the feature effects from large to small by using SPA, the number of features was gradually increased in order and PCA analysis is performed, and the ED between data points with different water core degree gradually increased. It can be seen that, all the features of the 900-1700 nm spectrum are beneficial in the classification and recognition.

The detail feature extraction process can refer to the feature extraction by SPA, PCA, and Ed in 2.1.3.

3.1.4 PLSR and PNN Detection

Figure 9:
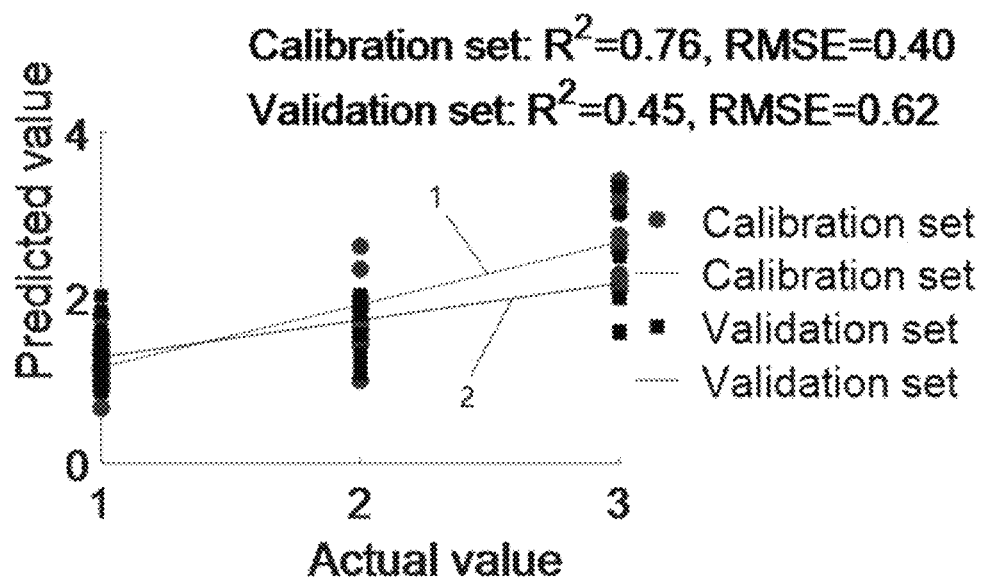
FIG. 9 is a diagram of detection results of water core disease of pineapples by 900-1700 nm spectrum combined with PLSR in Embodiment 2 according to the present disclosure.

In detail, referring to FIG. 9, the detection results of water core disease of pineapples acquired according to the calibration set and validation set by using PLSR are illustrated, respectively. In FIG. 9, the circle points represent the coordinate points formed by the predicted values and the actual values of the samples according to the calibration set, the square points represent the coordinate points formed by the predicted values and the actual values of the samples according to the validation set, and the line 1 represents the linear fitting trend between the predicted values and the actual values of the water core degree of the samples in the calibration set, the line 2 represents the linear fitting trend between the predicted values and the actual values of heart core degree of the samples in the validation set.

Due to a large number of circle points and square points, the circle points and square points may not be seen clearly in FIG. 9, the line 1 and the line 2 are drawn by computer software according to the value of each point, and $R^2$ and RMSE are accurate and true.

After repeated training, the modeling parameter FN of PLSR is determined to 11, back-judgment $R^2$ and RMSE for the calibration set are 0.76 and 0.40, respectively, and detection $R^2$ and RMSE for the validation set are 0.45 and 0.62, respectively. After rounding the output result, the accuracy rate of back-judgment for the calibration set is 80.60% (i.e., 4 no heart cores are misjudged as slight water cores; 3 slight water cores are misjudged as no heart core, and 1 slight water core is misjudged as heavy water core; 5 heavy heart cores are misjudged as slight heart cores), and the detection accuracy for the validation set is 58.82% (i.e., 5 no heart cores are misjudged as slight water cores; 3 slight water cores are misjudged as no heart core; 6 heavy heart cores are misjudged as slight heart cores), the detection effect is not good.

Modeling and detecting the water core disease of pineapples according to the calibration set and the validation set by using the PNN, after repeated training, the parameter Spread value of PNN model is set to 0.1, the accuracy rate of back-judgment of the PNN model for the calibration set is 100%, and the detection accuracy rate for the validation set is 62% (i.e., 1 no heart core is misjudged as slight water cores, and 4 no heart cores are misjudged as heavy water cores; 4 slight water cores are misjudged as no heart core, and 1 slight water core is misjudged as heavy water core; 1 heavy heart core is misjudged as slight heart cores, and 2 heavy heart cores are misjudged as no water cores), thus, the detection effect is not good.

Embodiment 3

Detection of Water Core Disease of Pineapples by 400-1700 nm Spectrum

4.1.1 Original Data and PCA Recognition

Figure 10A:
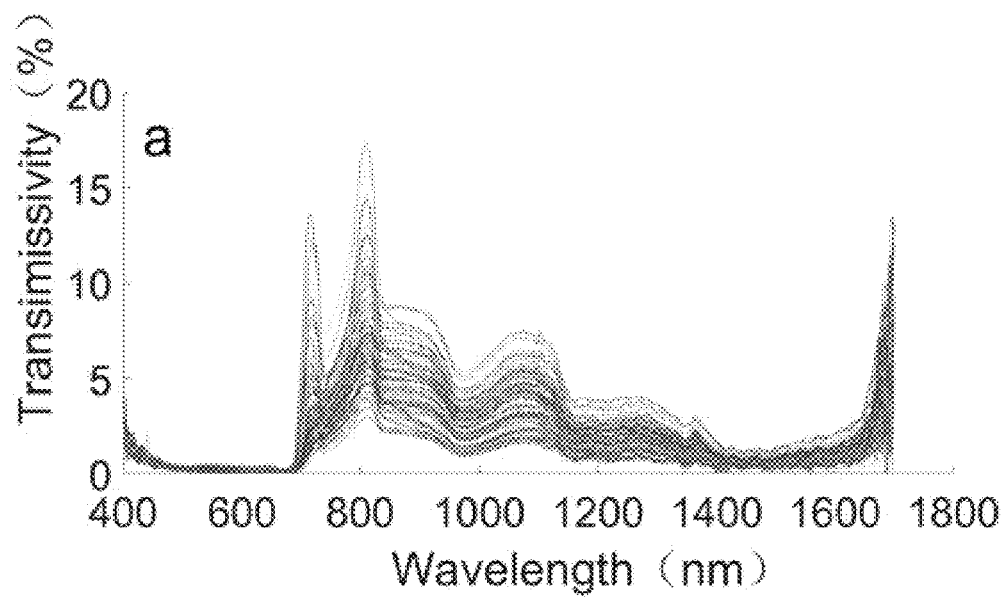
FIG. 10A is an original spectrum in Embodiment 3 according to the present disclosure.
Figure 10B:
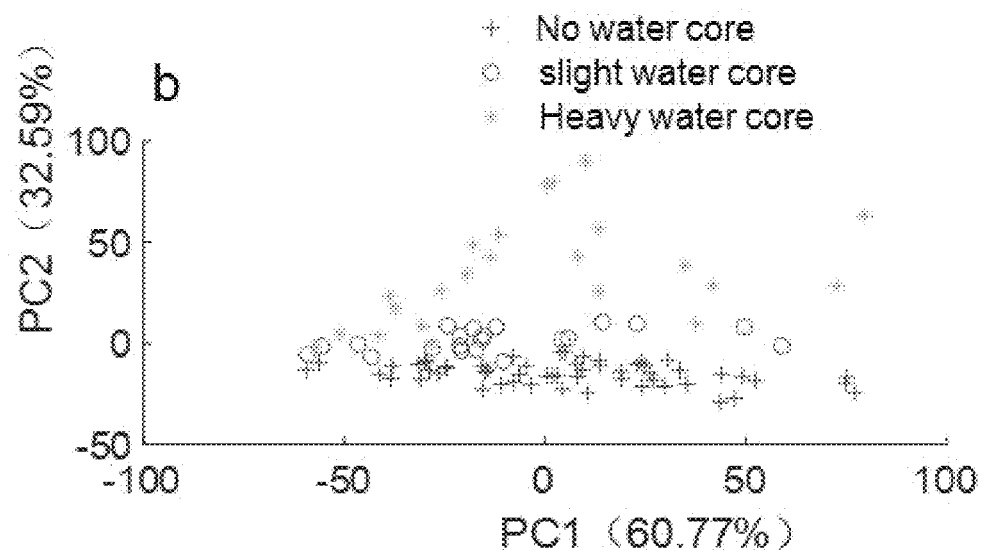
FIG. 10B is a schematic diagram of PCA recognition of water core degree by 400-1700 nm raw spectral data in Embodiment 3 according to the present disclosure.

Referring to FIG. 10A, raw spectra with a wavelength band of 400-1700 nm of the pineapple samples is illustrated, obvious noise fluctuations appear in the data after a wavelength of 1000 nm Referring to FIG. 10B, the PCA recognition results of water core degree of pineapples corresponding to 400-1700 nm raw data are illustrated. The contribution rate of first principal components (PC1) is 60.77%, and the contribution rate of second principal components (PC2) is 32.95%, and the total contribution rate is 93.36%, which is similar with FIG. 2B. Pineapple samples with different water core degree can be distinguished, however, the Euclidean distance is small, the dispersion degree is high, and the clustering performance is poor.

4.1.2 SG Filter, SNV Correction, and PCA Recognition

Figure 11A:
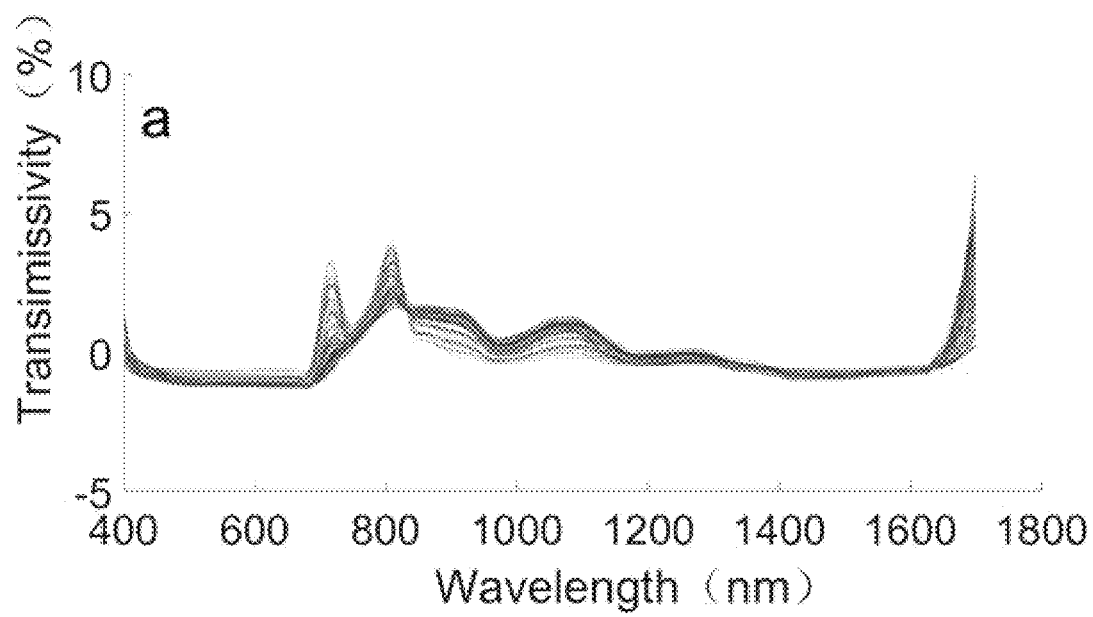
FIG. 11A is a spectrum acquired by filtering out noise fluctuations and correcting scattered noise in Embodiment 3 according to the present disclosure.
Figure 11B:
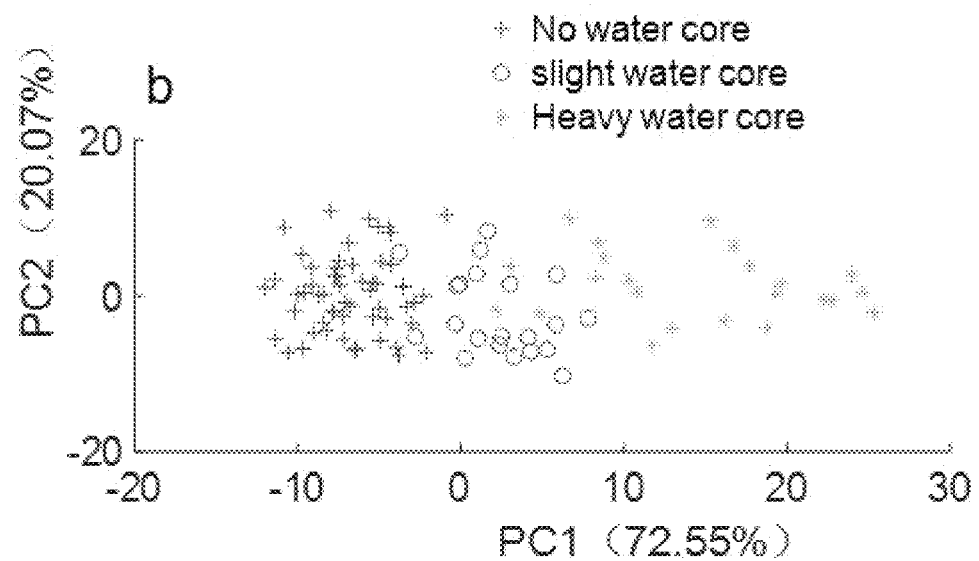
FIG. 11B is a schematic diagram of PCA recognition of water core degree by SG and SNV processing a spectrum with a wavelength band of 400-1700 nm in Embodiment 3 according to the present disclosure.

In order to ensure the cohesion of the overall spectral curve and noise reduction effect, the third-order 41-point SG processing can better filter out the noise fluctuations in the spectral data, and then the scattered noise in the spectral signals is corrected by using the SNV, and the processed pineapple spectrum signals are shown in FIG. 11A. Referring to FIG. 11B, the PCA recognition results of the water core degree of pineapples based on the processed spectral signals are illustrated. The contribution rates of PC1 and PC2 are 72.55% and 20.07%, respectively, and the total contribution rate is 92.62%. PCA can also distinguish different water core degree effectively, compared with FIG. 2B, there is a less amount of data point overlap between different samples, the clustering performance is slightly reduced, and there is still a risk of misjudgment in actual classification.

4.1.3 Feature Extraction By SPA, PCA, and ED

Figure 12:
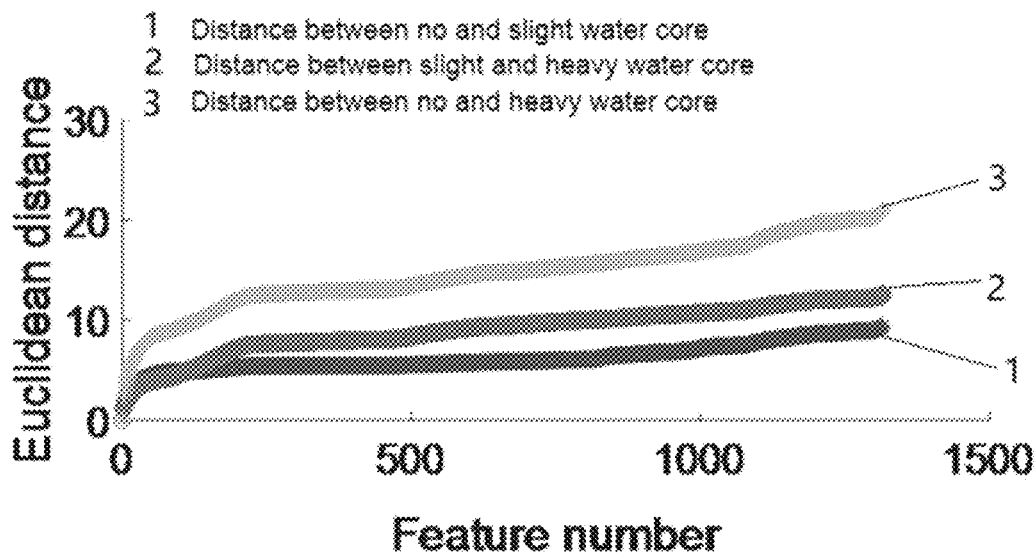
FIG. 12 is an analysis diagram of effect of SPA, PCA, and ED on 400-1700 nm spectrum features in Embodiment 3 according to the present disclosure.

Referring to FIGS. 11B and 12, the analysis results of the effect of SPA, PCA, and ED on the spectral features are illustrated. After sorting the feature effects from large to small by using SPA, the number of features was gradually increased in order and PCA analysis is performed, and the ED between data points with different water core degree gradually increased. It can be seen that, all the features of the 400-1700 nm spectrum are beneficial in the classification and recognition.

The detail feature extraction process can refer to the feature extraction by SPA, PCA, and Ed in 2.1.3.

4.1.4 PLSR and PNN Detection

Figure 13:
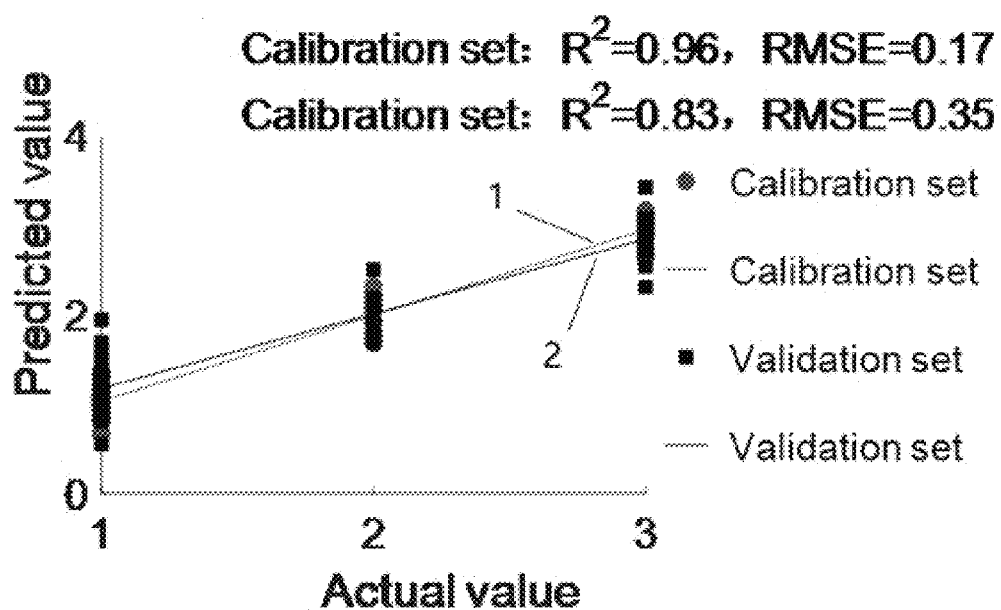
FIG. 13 is a diagram of detection results of water core disease of pineapples by 400-1700 nm spectrum combined with PLSR in Embodiment 3 according to the present disclosure.

In detail, referring to FIG. 13, the detection results of water core disease of pineapples acquired according to the calibration set and validation set by using PLSR are illustrated, respectively. In FIG. 13, the circle points represent the coordinate points formed by the predicted values and the actual values of the samples according to the calibration set, the square points represent the coordinate points formed by the predicted values and the actual values of the samples according to the validation set, and the line 1 represents the linear fitting trend between the predicted values and the actual values of the water core degree of the samples in the calibration set, the line 2 represents the linear fitting trend between the predicted values and the actual values of the heart core degree of the samples in the validation set.

Due to a large number of circle points and square points, the circle points and square points may not be seen clearly in FIG. 13, the line 1 and the line 2 are drawn by computer software according to the value of each point, and $R^2$ and RMSE are accurate and true.

After repeated training, the modeling parameter FN of PLSR is determined to 14, back-judgment $R^2$ and RMSE for the calibration set are 0.96 and 0.17, respectively, and detection $R^2$ and RMSE for the calibration set are 0.83 and 0.35, respectively. After rounding the output result, the accuracy rate of back-judgment for the calibration set is 100%, and the detection accuracy rate for the validation set is 88.24% (i.e., 3 no heart cores are misjudged as slight water cores; 1 heavy heart cores are misjudged as slight heart cores).

Modeling and detecting the water core disease of pineapples according to the calibration set and the validation set by using the PNN, after repeated training, the parameter Spread value of PNN model is set to 0.2, the accuracy rate of back-judgment of the PNN model for the calibration set is 100%, and the detection accuracy rate for the validation set is 91.18% (i.e., 1 no heart core is misjudged as slight water core; 2 heavy heart cores are misjudged as slight heart cores), thus, the detection is effective.

Third Part: Results and Discussion

Discuss

The occurrence of water core disease of pineapples is accompanied by changes in pulp texture, color and composition, preliminary studies on other small thin-skinned fruits have shown that, those features can be captured by the visible/near infrared spectrum. Therefore, there is evidence to detect the occurrence water core degree of pineapples by the visible/near infrared spectrum provided in the present disclosure. The present disclosure further verifies that the visible/near-infrared spectrum combined with signal preprocessing and model recognition is feasible to non-destructively detect the occurrence of water core disease of pineapples.

Pineapples belong to large fruits, and the spectral transmittance of light while detecting is poor, signal fluctuation may be caused, and the surface of the pineapple is extremely rough, which may easily form scattered noise. Therefore, the present disclosure adopts SG and SNV processing, to effectively reduce the interference caused by the signal fluctuation and scattered noise, and improve the recognition effect. Feature extraction is mainly to remove noise that may reduce the recognition accuracy, and maximize the retention of useful information to form information fusion. The SPA, PCA, and ED analysis results in the present disclosure show that, all features include useful information for classification and recognition, and should be retained.

The spectrometer QE pro (400-1100 nm) has better detection effect than the spectrometer NIR QUEST (900-1700 nm), because the spectrum of 400-1100 nm is sensitive to both texture, color, and compositional changes, while the spectrum of 900-1700 nm is only sensitive to texture and composition changes. In addition, the longer the wavelength, the worse the penetration performance of the spectral signal, the greater the attenuation after passing through the sample, and the lower the signal-to-noise ratio. The PLSR results show that, the use of the spectrometer QE pro in combination with the spectrometer NIR QUEST (400-1700 nm) can slightly improve the detection effect of the spectrometer QE pro, because the spectrum of 1100-1700 nm contains useful information for the recognition of water core disease of pineapples, which can supplement and fuse the information formed by the spectrum of 400-1700 nm, however, this method may increase the detection cost, and the cost performance is relatively low. For practical applications, it is recommended to use the spectrum of 400-1700 nm alone for the detection of water core disease of pineapples.

From the classification results of PCA on the water core disease of pineapples, it can be seen that, the boundary of the classification cannot be completely linearly separable, and there are certain nonlinear features, PNN pays more attention to the nonlinear features of the recognition process than PLSR, therefore, there is better effect in solving the detection of the water core disease of pineapples.

Conclusion

The present disclosure comprehensively considers the practical application cost and effect, and explores the recognition of water core disease of pineapples by detectors covering different visible/near-infrared spectral bands by independently building a platform. The results show that, the use of the visible/near-infrared spectrum combined with an appropriate recognition method can achieve a better non-destructive detection effect of water core disease of pineapples.

By using 400-1100 nm spectral raw data combined with PCA analysis, pineapple samples with different water core degree can be distinguished, however, the Euclidean distance is small, the dispersion degree is high, and the clustering performance is poor.

After SG and SNV processing, PCA can also effectively distinguish different water core degree, and the clustering performance of sample data points with a same category is significantly enhanced, but there are a small amount of overlapping data points between different samples, thus, there is a risk of misjudgment.

The results of SPA, PCA, and ED analysis show that, all features of the 400-1100 nm spectrum are beneficial in the classification and recognition process, and should be retained.

A back-judgement accuracy rate for the calibration set of water core disease of pineapples determined by the model established by PLSR is 98.51%, and a detection accuracy rate for the validation set is 88.24%. A back-judgement accuracy rate for the calibration set of water core disease of pineapples determined by the model established by PNN is 98.51%, and a detection accuracy rate for the validation set is 91.18%.

By using 900-1700 nm spectral raw data combined with PCA analysis, pineapple samples with different water core degree cannot be distinguished. After SG and SNV processing, and the clustering performance of sample data points with the same category is significantly enhanced, however, the classification effect is not good.

The results of SPA, PCA, and ED analysis show that, all features of the 900-1700 nm spectrum are beneficial in the classification and recognition process, and should be retained.

A back-judgement accuracy rate for the calibration set of water core disease of pineapples determined by the model established by PLSR is 80.60%, and a detection accuracy rate for the validation set is 58.82%. A back-judgement accuracy rate for the calibration set of water core disease of pineapples determined by the model established by PNN is 100%, and a detection accuracy rate for the validation set is 62%.

The detection effect of the spectrum of 900-1700 nm relative to the spectrum of 400-1100 nm is slightly improved, but not significantly. The original spectral data combined with PCA analysis can distinguish pineapple samples with different water core degree, after SG and SNV processing, the clustering performance of sample data points with the same category can be enhanced, and the SPA, PCA, and ED analysis results show that, all features of the 400-1100 nm spectrum are beneficial in the classification and recognition process. A back-judgement accuracy rate for the calibration set of water core disease of pineapples determined by the model established by PLSR is 100%, and a detection accuracy rate for the validation set is 88.24%. A back-judgement accuracy rate for the calibration set of water core disease of pineapples determined by the model established by PNN is 100%, and a detection accuracy rate for the validation set is 91.18%.

Considering the cost and effect comprehensively, the practical application adopts the spectrum of 400-1100 nm combined with SG, SNV, and PNN to detect the water core disease of pineapples.

Compared with prior art, SPA, CARS, GA and PSO are used to sort the spectral data features of pineapples, and PCA-ED was used to quickly test the distance changes between samples of different categories. The results showed that, SPA sorting can improve the distance of samples of different water core degree of pineapples faster than other methods. It is more suitable for spectral recognition and screening of pineapple water core disease.

The SPA provided in the present disclosure is determined by comparison with other algorithms (CARS, GA, and PSO), and the sorting can improve the classification effect of pineapples with different water core degree more quickly.

The present disclosure adopts PCA and ED to verify. PCA can reduce data dimension directly and effectively reflect the original distribution of data and analyze the classification effect in a two-dimensional space, ED algorithm can quantify the PCA classification results, so as to realize effective judgment of feature extraction effect, the operations are simple, the calculation amount is small, the result is objective and visible.

Combining with SPA, PCA, and ED provides a better method for the classification of water core disease of pineapples.

Figure 19:
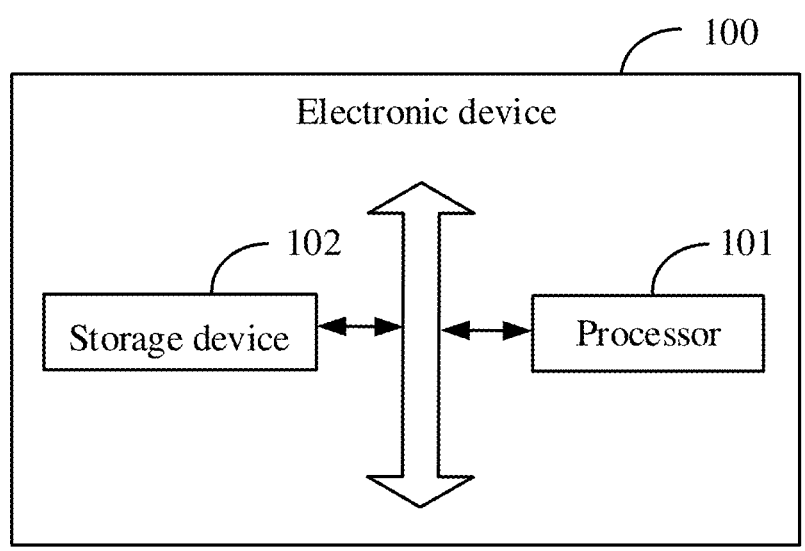
FIG. 19 is a block diagram of an embodiment of the electronic device according to the present disclosure.

FIG. 19 illustrates an electronic device 100 in one embodiment. The electronic device 100 includes, but is not limited to, a processor 101, a storage device 102, and a computer program. FIG. 19 illustrates only one example of the electronic device 100. Other examples can include more or fewer components than as illustrated or have a different configuration of the various components in other embodiments.

The processor 101 can be a central processing unit (CPU), a microprocessor, or other data processor chip that performs functions in the electronic device 100.

In one embodiment, the storage device 102 can include various types of non-transitory computer-readable storage mediums. For example, the storage device 102 can be an internal storage system, such as a flash memory, a random access memory (RAM) for the temporary storage of information, and/or a read-only memory (ROM) for permanent storage of information. The storage device 102 can also be an external storage system, such as a hard disk, a storage card, or a data storage medium.

The storage device 102 stores instructions, the processor 10 executes the computer program stored in the storage device 102 for implementing the feature extraction method (i.e., steps 1 to 9), the model training method (i.e., steps 10 to 20, and the detection method of fruit spectrum provided in the embodiments of the present disclosure. The computer program includes a feature extraction program, a model training program, and a detection program, and further includes instructions.

Technical features in the above embodiments can be combined arbitrarily. For concise description, not all possible combinations of the technical features in the above embodiments are described. However, any combination of the technical features described in the above embodiments should fall within the scope of the present disclosure, as long as no conflict occurs between the combined technical features.

The above embodiments, which are described in detail, are merely some implementations of the present disclosure, but they should not be construed to limit the scope of the present disclosure. It should be pointed out that, various modifications and improvements can be made by those skilled in the art without departing from the concept of the present disclosure. These modifications and improvements shall be encompassed by the protection scope of the present disclosure as defined by the appended claims.

What is claimed is:

1. A feature extraction method of fruit spectrum of non-destructive detection comprising:

step 1: taking a vector of each wavelength point in spectra of N samples as source data, and acquiring a sorting of all vectors by processing the source data by a successive projection algorithm, a spectrum matrix of the N samples having J columns, and J being equal to a number of wavelength points, each vector in the spectrum matrix constituting a column, selecting a j-th vector in the spectrum matrix, and assigning a value of the j-th vector to be $x_j$, determining a set of unselected vectors as s, calculating a projection vector $P_{xj}$ of $x_j$ to each of the set of unselected vectors s, extracting a wavelength of a maximum projection vector, adding the wavelength with the maximum projection vector into a wavelength combination, a linear relationship between each newly added wavelength and a previously added wavelength being the smallest by performing cross-validation analysis in each iteration, the sorting of all vectors being acquired according to the wavelength combination;

wherein the vector corresponds to the wavelength point one-to-one, the vector is a set of transmittances of each sample at the wavelength point;

wherein the spectra of the samples are acquired by infrared light emitted by a spectrometer passing through the samples based on a principle of visible and/or near-infrared light transmission;

wherein the N samples are N fruits of a same category;

step 2: according to the sorting of the vectors, acquiring first distribution points of each sample on a coordinate system by taking all of the vectors before a vector in a (M+1)-th position as input values of Principal Component Analysis for calculation; wherein an abscissa of the coordinate system is first principal components, and an ordinate of the coordinate system is second principal components; M is a positive integer, and M<(N−2);

step 3: acquiring classification results of the samples by destructive analysis, and acquiring a plurality of first sample categories by importing the classification results into the first distribution points acquired in step 2, wherein the first distribution points of a same classification result form a first sample category;

step 4: acquiring a first Euclidean distance between the first sample categories;

step 5: according to a sorting of the wavelength points, acquiring second distribution points of each sample on the coordinate system by taking all of the vectors before a vector in a (M+2)-th position as input values of the Principal Component Analysis for calculation;

step 6: acquiring a plurality of second sample categories by importing the classification results into the second distribution points acquired in step 5;

step 7: acquiring a second Euclidean distance between the second sample categories;

step 8: determining whether the first Euclidean distance is less than the second Euclidean distance, in response that the first Euclidean distance is less than the second Euclidean distance, determining a (M+2)-th vector to be valid data; and in response that the first Euclidean distance is not less than the second Euclidean distance, determining the (M+2)-th vector to be invalid data;

wherein the samples are pineapples.

2. The feature extraction method of fruit spectrum of non-destructive detection according to claim 1, wherein the fruits of the same category refer to fruits of a same variety, or fruits of the same variety and a same size, or fruits of the same variety, the same size, and a same place of origin, or fruits of the same variety, the same size, the same place of origin, and a same picking batch, and a wavelength band of the spectrum ranges from 400 to 1100 nm.

3. The feature extraction method of fruit spectrum of non-destructive detection according to claim 1, wherein the classification result is a classification of different sweetness of fruits, or a classification of different degrees of disease, or a classification of different acidity, or a classification of different hardness.

4. The feature extraction method of fruit spectrum of non-destructive detection according to claim 1, further comprising:

step 9: repeating steps 2 to 8 and gradually increasing the number of vectors, and acquiring all valid data; and forming a feature set comprising all valid data.

5. A model training method of heart core disease of pineapples of non-destructive detection based on visible and/or near infrared spectrum comprising:

step 10: acquiring spectra of N samples;

wherein the spectra are acquired by infrared light emitted by a spectrometer passing through the samples based on a principle of visible and/or near-infrared light transmission;

step 20: acquiring a feature set by processing the spectra acquired in step 10 using a method in claim 4;

step 30: establishing a model according to the feature set by using partial least squares regression algorithm or probabilistic neural network algorithm; and step 40: training the model by a plurality of samples.

6. The model training method according to claim 5, wherein a wavelength band of the spectrum ranges from 400 to 1100 nm.

7. The model training method according to claim 5, wherein step 10 further comprises:

filtering out noise fluctuations in spectral signals and correcting scattered noise.

8. A non-destructive detection method of heart core disease of pineapples comprising:

detecting whether a pineapple has a water core disease according to a model established in claim 5.

9. The non-destructive detection method of heart core disease of pineapples according to claim 8, wherein a spectrometer is used in the method for detection, the spectrometer comprises:

a light source;

a light receiver; and a support platform arranged between the light source and the light receiver;

wherein a light baffle plate is arranged between the light receiver and the support platform, a light hole is formed on a position of the light baffle directly facing the light receiver, the number of lamps of the light source is six, the lamps are arranged on three layers, two lamps are arranged on a upper layer, two lamps are arranged on a middle layer, and two lamps are arranged on a lower layer; the lamps on the middle layer is at a same height as the light receiver.

\* \* \* \* \*